United States Patent
Foster et al.

(10) Patent No.: US 11,313,578 B2
(45) Date of Patent: *Apr. 26, 2022

(54) ROLLER MEMBER FOR USE IN AN APPARATUS FOR CLOSING PITTSBURGH SEAMS ASSOCIATED WITH DUCT ASSEMBLIES AND OTHER BOX-SHAPED MEMBERS

(71) Applicant: Vicon Machinery LLC, Pevely, MO (US)

(72) Inventors: Dale R. Foster, Barnhart, MO (US); Bert Michael Fischer, Festus, MO (US)

(73) Assignee: Vicon Machinery LLC, Pevely, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/793,697

(22) Filed: Feb. 18, 2020

(65) Prior Publication Data
US 2020/0182507 A1    Jun. 11, 2020

Related U.S. Application Data

(60) Continuation of application No. 15/485,741, filed on Apr. 12, 2017, now Pat. No. 10,612,812, which is a division of application No. 13/715,209, filed on Dec. 14, 2012, now Pat. No. 9,623,472, which is a
(Continued)

(51) Int. Cl.
| | |
|---|---|
| *F24F 13/02* | (2006.01) |
| *B21D 39/02* | (2006.01) |
| *B21B 27/02* | (2006.01) |
| *F16L 23/14* | (2006.01) |

(52) U.S. Cl.
CPC .......... *F24F 13/0209* (2013.01); *B21B 27/02* (2013.01); *B21D 39/023* (2013.01); *F16L 23/14* (2013.01)

(58) Field of Classification Search
CPC .............................. B21D 39/021; B21D 51/32
USPC .... 72/48, 49, 50, 51, 52; 29/243.57, 243.58; 492/1, 30
See application file for complete search history.

(56) References Cited

U.S. PATENT DOCUMENTS

| | | |
|---|---|---|
| 2,076,228 A | 4/1937 | Dressing |
| 2,330,756 A | 9/1943 | Stanger |
| 3,015,293 A | 1/1962 | Parham |

(Continued)

*Primary Examiner* — Jason L Vaughan
(74) *Attorney, Agent, or Firm* — Husch Blackwell LLP

(57) ABSTRACT

A vertical Pittsburgh Seam closing apparatus having a base supporting surface, a track mechanism for moving a carriage assembly which holds seam forming members used to close a Pittsburgh Seam, a pair of upper and lower guide members for guiding the duct section into a proper vertical position, and upper and lower clamping members positioned inside the duct section and adjacent the inside portion of the Pittsburgh Seam to be closed, the upper guide members and clamping member being selectively movable and adjustable for accommodating different duct section lengths. In one embodiment, the seam forming assembly includes three roller members mounted in vertical arrangement to each other, one roller member being V-shaped in configuration and the other two roller members being substantially cylindrical in shape. The V-shaped roller member may also include one or more projecting members for forming dimples in the closing process to prevent shifting and/or slipping of the closed seam.

5 Claims, 12 Drawing Sheets

Related U.S. Application Data continuation-in-part of application No. 13/358,972, filed on Jan. 26, 2012, now Pat. No. 9,375,776.

(60) Provisional application No. 61/436,599, filed on Jan. 26, 2011.

(56) References Cited

U.S. PATENT DOCUMENTS

| | | |
|---|---|---|
| 3,154,037 A | 10/1964 | Martin |
| 3,188,729 A | 6/1965 | Pogue, Jr. et al. |
| 3,487,669 A | 1/1970 | Kemp |
| 4,395,894 A | 8/1983 | McCorvey |
| 5,105,640 A | 4/1992 | Moore |
| 5,189,784 A | 3/1993 | Welty |
| 5,243,750 A | 9/1993 | Welty |
| 5,353,616 A | 10/1994 | Fischer et al. |
| 5,720,095 A | 2/1998 | Lennartsson |
| 6,460,573 B1 | 10/2002 | Fischer et al. |
| 6,471,256 B1 | 10/2002 | Fischer |
| 6,715,329 B1 | 4/2004 | Hametner |
| 6,810,570 B2 | 11/2004 | Fischer et al. |
| 6,981,398 B2 | 1/2006 | Toben et al. |
| 7,775,076 B2 | 8/2010 | Schultz et al. |
| 8,561,448 B2 | 10/2013 | Borwig |
| 9,375,776 B2 | 6/2016 | Baker et al. |
| 9,511,409 B2 | 12/2016 | Baker et al. |

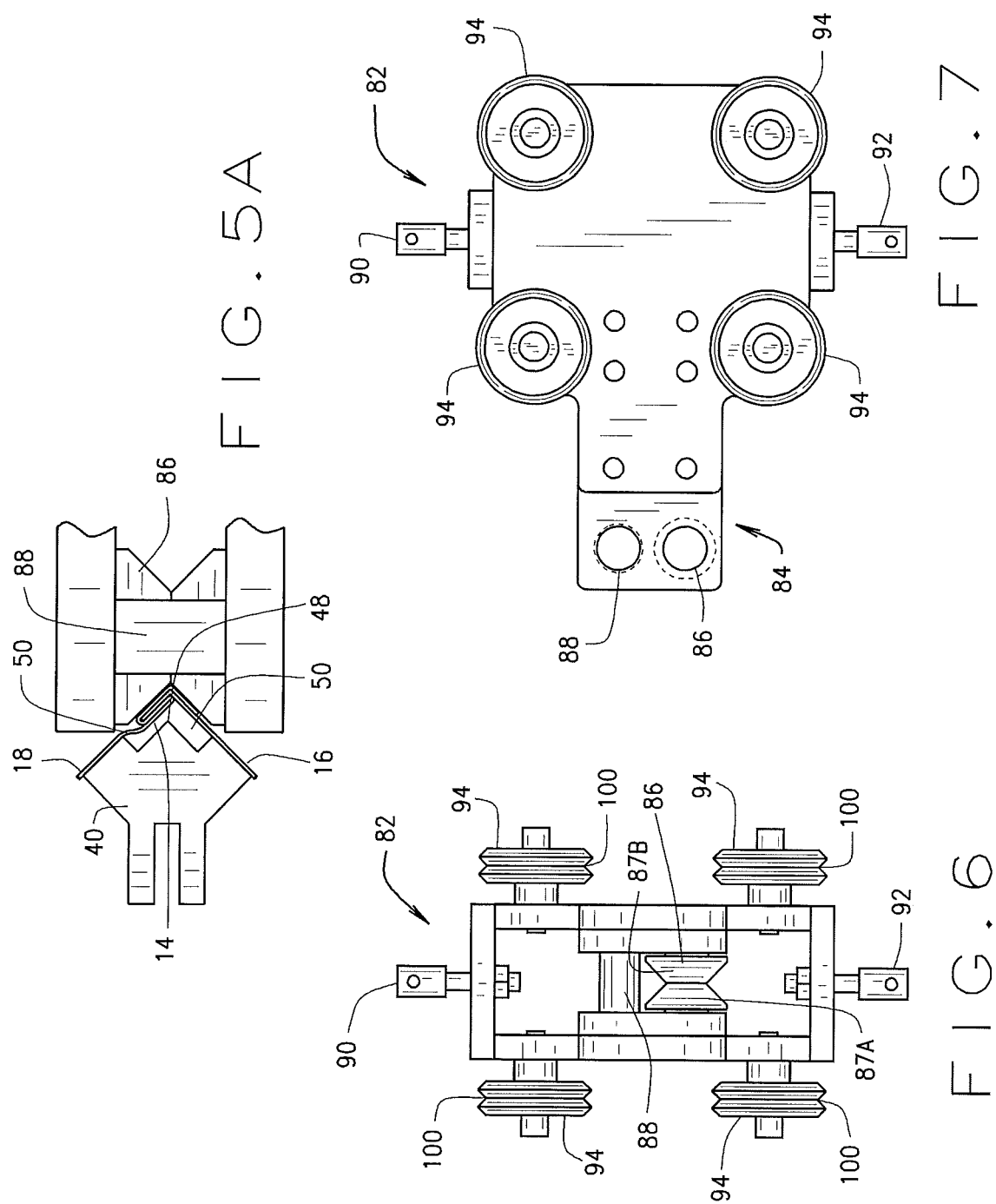

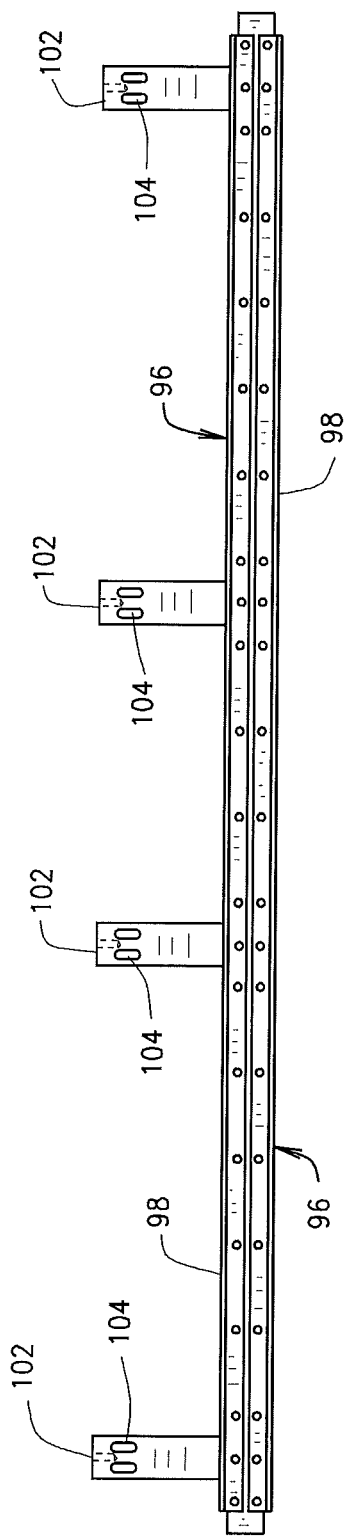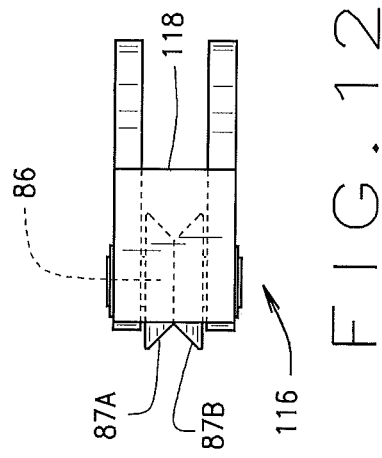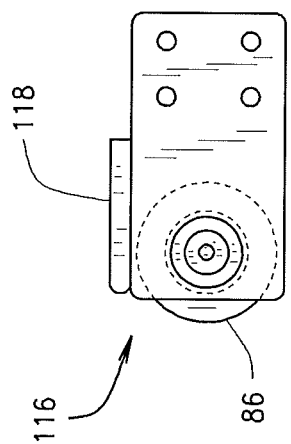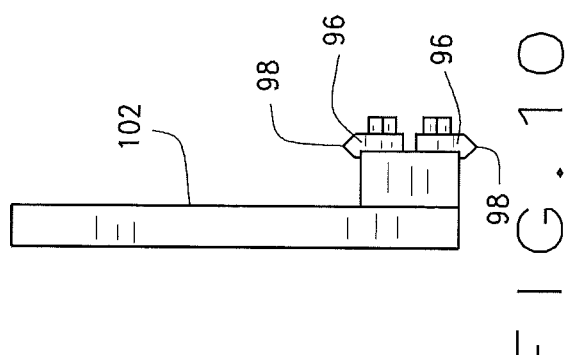

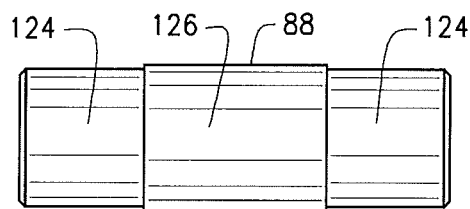
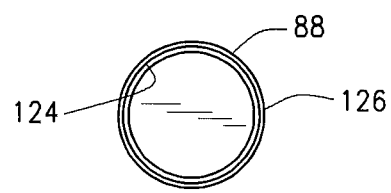
FIG. 15  FIG. 16
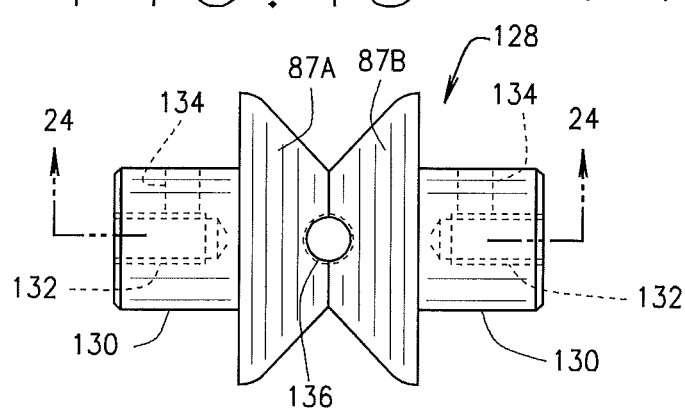
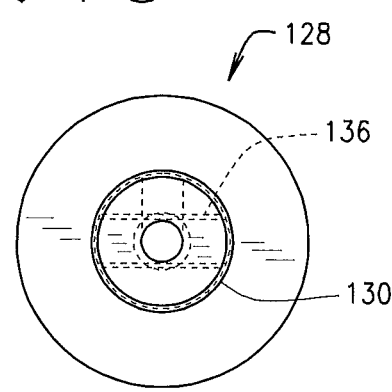
FIG. 17  FIG. 18
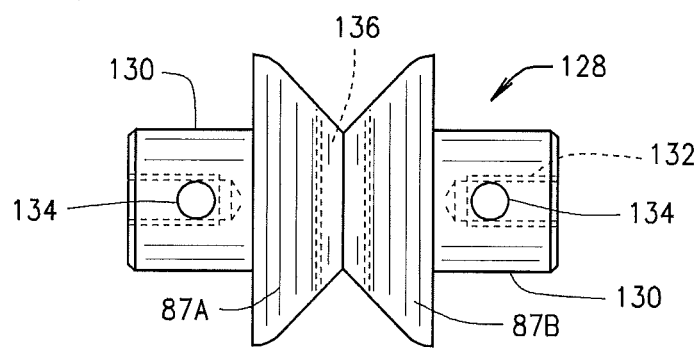
FIG. 19
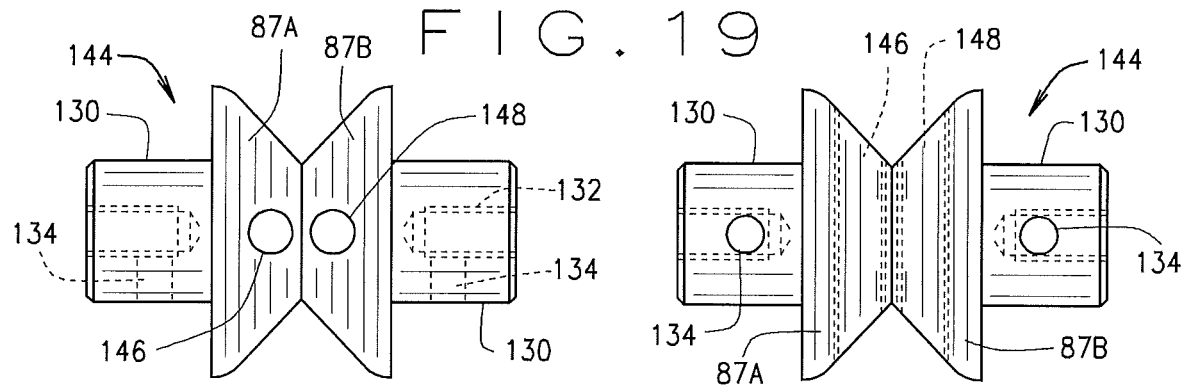
FIG. 20  FIG. 21

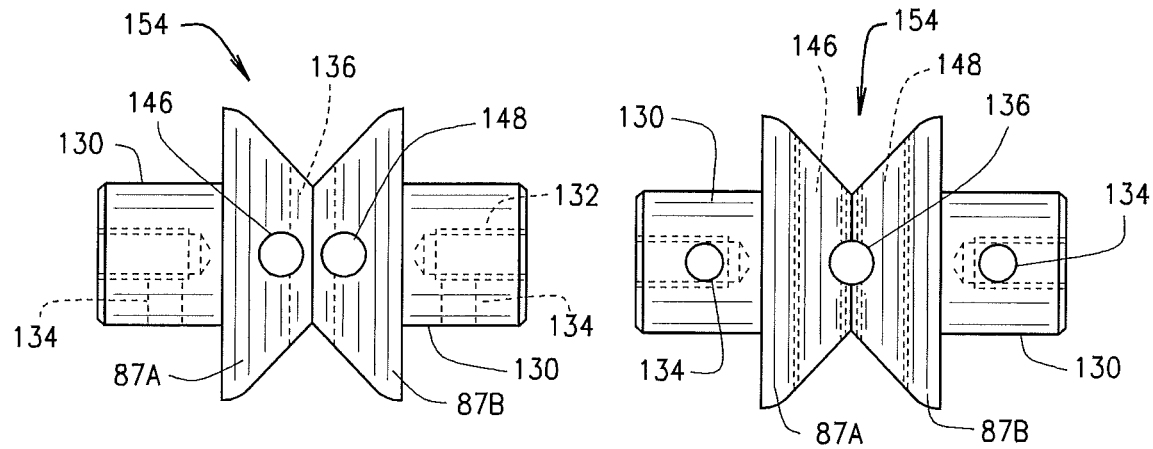
FIG. 22
FIG. 23
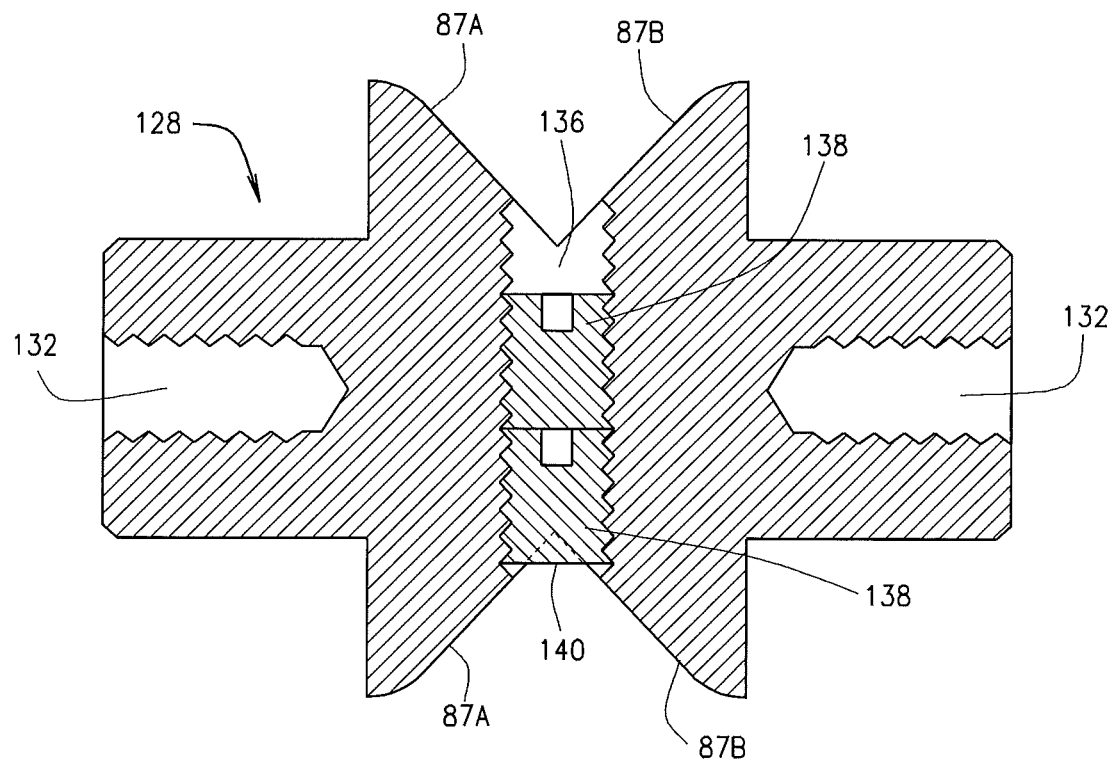
FIG. 24

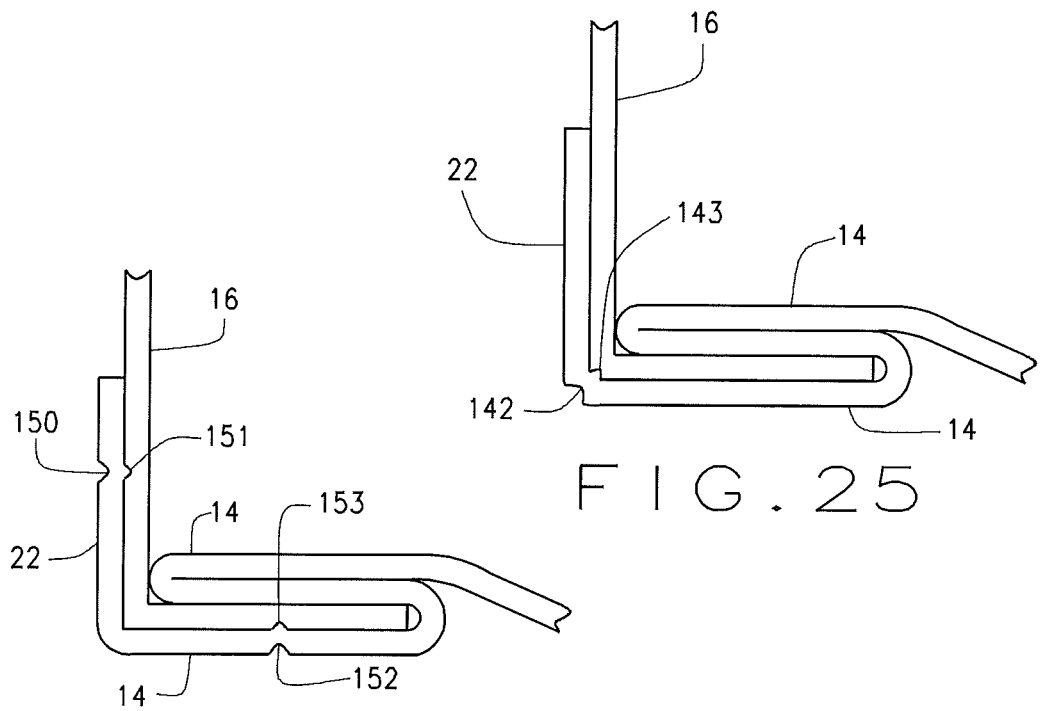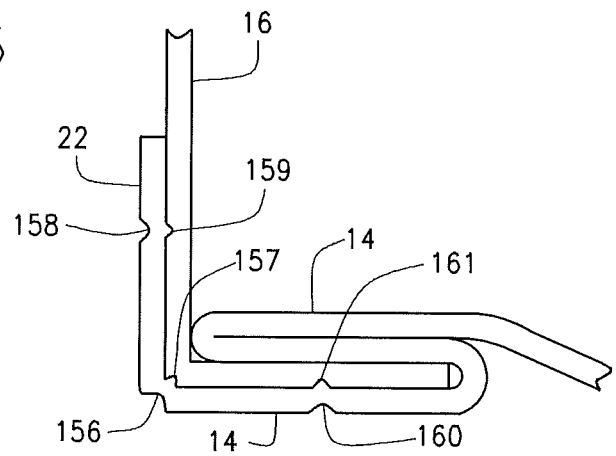

ROLLER MEMBER FOR USE IN AN APPARATUS FOR CLOSING PITTSBURGH SEAMS ASSOCIATED WITH DUCT ASSEMBLIES AND OTHER BOX-SHAPED MEMBERS

CROSS REFERENCE TO RELATED APPLICATION

This application is a continuation of U.S. patent application Ser. No. 15/485,741 filed Apr. 12, 2017, which is a divisional of U.S. patent application Ser. No. 13/715,209 filed Dec. 14, 2012, which is a continuation-in-part of U.S. patent application Ser. No. 13/358,972 filed on Jan. 26, 2012, both of which are entitled Apparatus For Closing Pittsburgh Seams Associated With Duct Assemblies and Other Box-Shaped Members, and claims priority to and the benefit of U.S. Provisional Patent Application Ser. No. 61/436,599 filed on Jan. 26, 2011 and entitled Apparatus For Closing Pittsburgh Seams Associated With Duct Assemblies and Other Box-Shaped Members, the entire disclosures of which are incorporated herein by reference.

BACKGROUND OF INVENTION

The present invention relates generally to forming duct assemblies for transporting pressurized fluid therethrough such as heating and cooling air and, more particularly, to an apparatus for mechanically closing one or more Pittsburgh Seams associated with metal duct sections used to form duct assemblies commonly associated with forced air HVAC systems.

Rectangular or box-shaped duct assemblies are extensively used in both commercial and residential applications to transport and distribute heated or cooled air to a building, personal residence, or other structure. Duct assemblies are conventionally formed in sections and secured together to form longer spans as needed. A duct section is typically formed of sheet metal into a rectangular shape having four sides which are joined together through the use of one or more commonly employed Pittsburgh Seams.

Each duct section can be formed using a plurality of different forming techniques such as bending two pieces of sheet metal of the desired length at a 90° angle and joining such sections together along opposed complimentary edges through the use of a conventional Pittsburgh Seam. This application requires the use of two Pittsburgh Seams. In another method and application, all four sides of a typical duct section can be formed in a single continuous process requiring the use of a single Pittsburgh Seam to join the two opposite ends of the sheet metal to form the completed duct section. In this application, a single Pittsburgh Seam is needed to complete the process. Still other methods and applications may require the use of more than two Pittsburgh Seams depending upon the shape and configuration of the duct section. Regardless of the number of Pittsburgh Seams utilized in a particular duct assembly, these seams must be properly closed as will be hereinafter explained.

Pittsburgh Seams are commonly used to join the seams of metal duct sections, whether these sections are rectangular, tapered, rounded, or some other configuration. A Pittsburgh Seam includes a male portion and a female portion, the male portion being associated with one edge portion of the sheet metal portion forming the duct section and the female portion being associated with a corresponding edge portion associated with another sheet metal portion forming the duct section. The male portion of the Pittsburgh Seam includes a flange portion formed along the length of one edge of the sheet metal portion which is bent over at approximately a 90° angle and is insertable into a groove or cavity associated with the female portion of the Pittsburgh Seam, the female portion including an overhanging edge portion which extends beyond the partially formed seam for bending to complete the closing of the seam. During assembly of a particular duct section, the male portion of the Pittsburgh Seam associated with one edge portion of a duct portion is insertable into the female portion associated with another edge portion of a duct portion so as to leave an overhanging edge portion extending beyond the partially formed seam. When the various parts of the duct section are thus pre-assembled and the duct section is formed, the Pittsburgh Seams, although engaged, will not be closed or locked. In order to lock or close these seams, it is necessary to bend the overhanging edge portion of the Pittsburgh Seam extending beyond the partially formed seam inwardly so that it lies adjacent to and against the outer surface of the sheet metal portion incorporating the male portion of the Pittsburgh Seam. When this overhanging edge portion is bent into proper position, the Pittsburgh Seam will be closed and locked.

At the present time, the commonly used Pittsburgh Seam is closed either manually using a hand hammer or a power tool, or it is mechanically bent using known Pittsburgh Seam closer apparatus such as the apparatus disclosed in U.S. Pat. Nos. 5,189,784; 5,243,750; and 5,353,616. Manual closing of the Pittsburgh Seam is time consuming, tedious, and creates a large amount of noise. The known apparatus for mechanically closing a Pittsburgh Seam require a specific orientation of the seam within the closing apparatus in order to be effective and operative in closing such seam. In this regard, operators must turn and orient the duct section so as to match the direction of the machine in closing the seam. If the duct section is not properly oriented, the seam will not be closed and a reject will occur. In addition, the known Pittsburgh Seam closing apparatus do not always provide sufficient strength and support to various parts of the apparatus depending upon the force required and exerted during the seam closing process when heavier gauges of sheet metal are used to form a particular duct section; and the known prior art apparatus are not easily adjustable to accommodate different lengths of duct sections to be seamed without changing supports and other parts of the apparatus. In some circumstances, the known prior art apparatus can only accommodate certain known standard sizes of duct sections. Some of the known prior art apparatus likewise bend the sheet metal against the side wall of the duct section during the seam closing process producing wrinkles or waves in the duct seam.

It is therefore desirable to provide an improved Pittsburgh Seam closing apparatus which will close a Pittsburgh Seam regardless of the orientation in which the duct section is placed within the apparatus, thereby improving not only the efficiency of the seam closing process but also the efficiency of the entire assembly process in forming a duct section and moving such formed duct section to the Pittsburgh Seam closer apparatus. It is also desirable to improve the overall strength of the machine and particularly the seam forming roller components and to provide an improved clamping arrangement whereby successful seaming can be accomplished from extremely light gauge metal, for example 26 gauge metal, through heavy gauge metal, for example 16 gauge metal, without the need to adjust the seam forming rollers for a tighter or looser setting. Known existing machines require adjustments for this range of metal in order to close the seam adequately or to keep from damaging either the machine or the duct section. Still further, it is also desirable to provide a Pittsburgh Seam closing device which is easily and quickly adaptable for accepting and closing Pittsburgh Seams associated with duct sections of any length within the machine's overall capacity without changing supports or other components of the overall apparatus. This feature will allow non-standard or odd sized duct sections to be seamed efficiently. The known existing machines are typically set for production of standard lengths of duct section and they do not allow for the closing of Pittsburgh Seams associated with odd sizes of duct sections, which odd sizes are necessary and exist in every installation. Instead, these odd sized duct sections are typically seamed manually by using a hammer.

Still further, it is likewise desirable to provide a Pittsburgh Seam closing apparatus wherein seam closing is accomplished without producing waves or wrinkles in the duct seam.

Accordingly, the present invention is directed to overcoming one or more of the problems as set forth above.

SUMMARY OF INVENTION

The present invention overcomes many of the shortcomings and limitations of the known prior art devices discussed above and teaches the construction and operation of several embodiments of a vertical Pittsburgh Seam closing apparatus which includes an improved seam forming assembly and carriage which enables the duct section to be positioned vertically on the machine regardless of the particular orientation of the Pittsburgh Seam thereby eliminating the need to orient or turn the duct section so as to match a particular direction of movement which is necessary when using existing machines. The positioning, shape and orientation of the seam forming assembly associated with the present apparatus likewise minimizes the amount of manual peening necessary to close opposite end portions of the Pittsburgh Seam prior to positioning the duct section on the present apparatus. The present apparatus also includes improved clamping means for clamping and holding a vertically oriented duct section on the present device regardless of the orientation of the Pittsburgh Seam, and improved adjustment means for easily adjusting the upper clamp head assembly for receiving duct sections of any length within the overall dimensions of the apparatus support frame and track assembly for accommodating non-standard lengths of duct sections which typically exist in every installation and need to be seamed.

In one aspect of the present invention, the present Pittsburgh Seam closing apparatus includes a base member having a supporting surface associated therewith for positioning and locating a duct section in a vertical orientation relative to the present apparatus. A suitable support framework is positioned on or adjacent one side of the base member and includes a vertical track mechanism for moving a carriage assembly which holds the seam forming or bending members used to close a Pittsburgh Seam. The base member includes a pair of lower guide members or clamp pads forming a lower guide assembly wherein the guide members are arranged substantially perpendicular to each other and are positioned in the shape of a "V" on the supporting surface for guiding the duct section and the associated Pittsburgh Seam into proper positioning on the base member. The V-shaped guide members or clamp pads are positioned and located and are adjustable such that the seam forming assembly is centrally positioned therebetween. The V-shaped clamp pads allow the duct section to be pressed into an interference fit with the seam forming assembly and also provides proper orientation of the duct section relative to the seam forming assembly.

The supporting surface further includes an elongated opening which is positioned and located in alignment with the seam forming assembly and includes a lower clamp head assembly having a clamping member which is pivotally rotatable between an unclamped position and a position where the clamping member is positioned inside the duct section and adjacent the inside portion of the Pittsburgh Seam to be closed. The lower clamp head assembly includes an actuator which pivotally rotates the clamping member between its clamped and unclamped position. The actuator can be electrically, hydraulically or pneumatically controlled from a control panel associated with the present apparatus. In addition, the clamping member includes a specially configured mating portion which enables the clamping member to properly engage and support the inside portion of the Pittsburgh Seam regardless of the orientation of the Pittsburgh Seam, and regardless of which side of the seam the female portion is located.

A similarly constructed upper clamp head assembly is mounted on a selectively movable and adjustable assembly such that the entire upper clamp head assembly can be moved and adjusted to accommodate any duct section length. The upper clamp head assembly likewise includes a pair of V-shaped guide members forming an upper guide assembly positioned in vertical alignment with the lower guide members for likewise guiding the upper portion of the duct section into proper position on the present apparatus. The upper clamping member is substantially identical to the lower clamping member and is likewise pivotally rotatable between an unclamped position and a clamped position where the clamping member is positioned inside the duct section and adjacent the inside portion of the Pittsburgh Seam to be closed. The upper clamping member is likewise pivotally rotated through the use of an actuator which is likewise controlled from a control panel associated with the present device. Once a particular duct section is positioned within the upper and lower guide members and the upper and lower clamping members are moved to their clamping positions, the duct section is properly oriented and positioned on the present apparatus and is ready for operative sealing of the Pittsburgh Seam.

In one embodiment, the present seam forming assembly includes a pair of roller members mounted in vertical arrangement to each other, the lower roller member being V-shaped in configuration and the upper roller member being substantially cylindrical in shape. The V-shaped forming roller member enables the Pittsburgh Seam to be positioned within the upper and lower guide members in any of the two possible orientations, namely, with the female portion of the seam located on either the left or right side of the seam, and, regardless of such orientation, the present apparatus still effects proper closure of the seam as will be hereinafter explained. Both seam forming members are positioned on a movable carriage, the carriage being guided on a vertical track system through the use of a chain and sprocket type assembly which is powered in a conventional manner through the use of a drive motor. The vertical track arrangement upon which the seam forming assembly moves is adjustable fore and aft relative to the upper and lower guide plates, if necessary, to produce sufficient force and interference between the forming members and the Pittsburgh Seam associated with the duct section clamped into position on the present device.

When activated, the carriage assembly carrying the seam forming assembly moves in a vertical direction from its lower start position to an upper position determined by the positioning of the upper clamp head assembly and then returns to its lower start position. As the seam forming assembly moves in an upward direction, the substantially cylindrically shaped roller member initially bends the overhanging seam edge portion approximately 45° and the bottom V-shaped roller member then completes the closing of the seam and moves the overhanging edge portion into a tight abutting relationship with the duct section. Because of its V-shape, the side of the V-shaped roller member not being used to form or close the seam holds one side of the duct section and supports that side of the duct section so that the opposite side of the duct section to be seamed presses against it to create the bending or forming action. In other words, one side of the V-shaped roller member holds the duct section in proper position while the other side of the V-shaped roller member actually bends the overhanging edge portion of the Pittsburgh Seam into its closed position. As a result, it makes no difference if the overhanging edge portion of the Pittsburgh Seam extends in a direction corresponding to either side of the V-shaped roller member since one side of the V-shaped roller member will bend the Pittsburgh Seam while the other side will provide sufficient support and force for completing the bending or forming action along the entire length of the seam. This is a substantial improvement over known existing apparatus which typically do not provide adequate support along the entire length of the seam.

When the seam forming assembly reaches the top of the duct section, it is returned to its lower start position by traversing the full length of the seam in the opposite direction. During this return run, the seam forming assembly will re-form the metal of the seam, if necessary, so as to remove any waves or wrinkles in the duct seam. Once the seam has been closed, the upper and lower clamp assemblies are moved to their unclamped position, and the duct section can be removed and rotated so that another seam can be positioned for closure.

In another aspect of the present invention, the top cylindrical seam forming roller can be replaced with a flat plate, a wiper block or other object which will bend the overhanging edge portion of the Pittsburgh Seam at least approximately 45° as previously explained. It is not necessary to have a roller member as the second seam forming member as described in the first embodiment. Any object and any configuration of such object which will achieve bending of the overhanging edge portion of the Pittsburgh Seam to approximately a 45° angle will achieve the stated purpose and will allow the V-shaped forming roller to complete the seaming process.

In still another aspect of the present invention, a second seam forming assembly and carriage can be positioned adjacent the upper guide members and can be operable independent of the lower seam forming assembly and carriage such that a dual carriage system can be achieved. In this particular embodiment, the lower seam forming assembly can move upwardly and traverse the vertical track a distance less than the full length of the duct section to be seamed and the upper seam forming assembly can move downwardly and traverse a distance less than the full length of the duct section to be seamed, but a distance which will overlap the seaming process of the lower seam forming assembly so as to ensure complete seaming of the Pittsburgh Seam to be closed. When both carriage systems return to their start position, the seaming process is complete. The timing of the independent movement of the two carriage systems can be computer controlled or manually controlled. The configuration of the upper seam forming carriage assembly will have the V-shaped roller member positioned above the cylindrical roller member or other forming member thereby allowing the seam forming assembly to be positioned closer to the terminal end portion of the seam to be closed. This results in less peening of that particular seam end portion as compared to the embodiment where a single seam forming roller carriage assembly is utilized. The second or upper seam forming carriage assembly will move on the same track as the lower assembly via a chain and sprocket assembly substantially similar to the lower carriage assembly. Other means for moving the second seam forming carriage assembly are likewise envisioned and anticipated such as by using another track system.

In still another embodiment, the present seam forming assembly includes three roller members mounted in vertical arrangement to each other, the center roller member being V-shaped in configuration and the upper and lower roller members being substantially cylindrical in shape. These three roller members are positioned on a movable carriage assembly substantially similar to the carriage assembly carrying the pair of roller members, this three roller carriage assembly likewise being guided on a vertical track system in a conventional manner. Like the pair of seam forming roller members, these three roller members likewise enable the Pittsburgh Seam to be positioned within the upper and lower guide members regardless of their orientation, the advantage of the three roller members being that the carriage assembly carrying these roller members can effectively close the Pittsburgh Seam in a single pass in either direction, either during its upward travel, or during its downward trend. The positioning of a substantially cylindrical roller member on either side of the V-shaped forming roller member enables a new Pittsburgh Seam to be closed to be positioned within the present device once the carriage assembly reaches its upper position and this new Pittsburgh Seam can be closed when the carriage assembly is moved from its upper position to its lower start position.

In this regard, when the three roller carriage assembly moves from its lower position to its upper position, the upper substantially cylindrically shaped roller member will initially bend the overhanging seam edge portion approximately 45° and the center V-shaped roller member will then complete the closing of the seam as previously described. The bottom substantially cylindrically shaped roller member will not affect the seam closing process during upward travel of the carriage assembly. When the carriage assembly reaches its upper position, the duct seam is completely closed and the duct section can be removed and rotated so that another seam, or another duct section, can be positioned for closure. When the carriage assembly moves from its upper position to its lower position, the lower substantially cylindrically shaped roller member will initially bend the overhanging seam edge portion approximately 45° and the center V-shaped roller member will again complete the closing of the seam as previously described. The upper substantially cylindrically shaped roller member will not affect the seam closing process during downward travel of the carriage assembly. This embodiment allows a single carriage assembly to completely close a Pittsburgh Seam in a single pass across the seam. This increases productivity of the present device and is more efficient as compared to the carriage assembly which only includes a pair of seam forming roller members.

In still another embodiment, the V-shaped roller member may include one or more openings or bores extending therethrough for receiving a set screw or other projection member for forming a plurality of dimples in the Pittsburgh Seam during the closing process as the V-shaped roller member completes the closing of the seam. In this regard, a tap hole, bore or opening can be positioned on one or both side portions of the V-shaped roller member, or at the joinder or apex of such side portions, so that a dimple can be formed on one or both sides of the closed Pittsburgh Seam, or at the corner thereof as will be hereinafter further explained. The set screw or other projection member associated with these tap holes or openings have a terminal end portion which extends beyond the surface portion or perimeter of the V-shaped roller member so as to form one or more dimples in the female portion of the Pittsburgh Seam during the closing process as the V-shaped roller closes the seam. The dimples are provided in the female portion of the Pittsburgh Seam such that when the female portion is mated with and engages the male portion during the closing process, these dimples will be moved and pressed into a tight abutting relationship with the male portion of the Pittsburgh Seam and will form an uneven, jagged, or locked connection at the point of each respective dimple thereby preventing shifting or slipping of the seam once the seam is closed. The set screws or projections associated with the tap holes or bores can be adjusted to adjust the overall depth of the dimples being formed.

In still another embodiment, it is recognized and anticipated that the dimples formed by the V-shaped roller can be manufactured and formed directly into the female portion of the Pittsburgh Seam during the duct forming process thereby eliminating the need for the V-shaped roller member to form such dimples. Forming the dimples directly into the female portion of a Pittsburgh Seam would improve the overall security of the Pittsburgh Seam once it is closed regardless of whether the Pittsburgh Seam is closed manually or through mechanical means such as through the use of the present apparatus. Again, use of the dimples provides added security to a closed Pittsburgh Seam thereby preventing any shifting or slipping of the seam once it is closed.

It is also recognized that the various systems associated with the present Pittsburgh Seam closing apparatus can be computer controlled and programmed such that movement of the various clamping assemblies and seam forming carriage assemblies will automatically take place upon proper positioning of the duct section within the apparatus, or upon activation of a start switch. It is also recognized that each step of the seam closing process can likewise be manually operated from a control panel associated with the present apparatus.

Because an operator does not need to orient the duct section to be seamed at a particular orientation, the present apparatus not only saves time and is more cost efficient with respect to orienting a duct section on the apparatus for a seaming operation, but it also saves substantial time and labor during the duct forming and assembly process when a pre-assembled duct section is formed and moved to the seam closing apparatus. The present apparatus likewise substantially eliminates improper closing of the Pittsburgh Seam due to improper orientation of the seam in a particular seaming device and it likewise reduces the number of rejects. The present apparatus therefore greatly improves the seam closing process and enables an operator to easily and quickly position a duct section on the present apparatus regardless of the orientation of the Pittsburgh Seam relative to the seam forming carriage assembly; it enables an operator to easily and quickly adjust the apparatus to accommodate duct sections of any length; and it substantially eliminates waves or wrinkles in the duct seam.

These and other aspects and advantages of the present vertical Pittsburgh Seam closing apparatus will become apparent to those skilled in the art after considering the following detailed description in connection with the accompanying drawings.

BRIEF DESCRIPTION OF THE DRAWINGS

FIG. 5A is a top plan form view showing the lower clamping member in its clamped position inside a typical duct section and adjacent the inside portion of a typical Pittsburgh Seam.

FIG. 6 is a front elevational view of one embodiment of a seam forming carriage assembly constructed in accordance with the teachings of the present invention.

FIG. 7 is a side elevational view of the carriage assembly of FIG. 6.

FIG. 9 is a side elevational view of one embodiment of a track system constructed in accordance with the teachings of the present invention.

FIG. 10 is a top plan form view of the track system of FIG. 9.

FIG. 11 is a side elevational view of another embodiment of a seam forming assembly constructed in accordance with the teachings of the present invention.

FIG. 12 is a top plan form view of the roller assembly of FIG. 11.

FIG. 15 is a front elevational view of the substantially cylindrical roller members associated with the carriage assembly of FIGS. 13 and 14.

FIG. 16 is a side elevational view of the substantially cylindrical roller members of FIG. 15.

FIG. 17 is a front elevational view of another embodiment of a V-shaped roller member constructed in accordance with the teachings of the present invention showing a tapped hole or bore positioned and located at the apex of the V-shaped roller member.

FIG. 18 is a side elevational view of the roller member of FIG. 17.

FIG. 19 is a front elevational view of the V-shaped roller member of FIG. 17 rotated approximately 90°.

FIG. 20 is a front elevational view of still another embodiment of a V-shaped roller member constructed in accordance with the teachings of the present invention showing a pair of tapped holes or bores extending therethrough, one bore being associated with one side portion of the V-shaped roller member and the other bore being associated with the other side portion thereof.

FIG. 21 is a front elevational view of the V-shaped roller member of FIG. 20 rotated approximately 90°.

FIG. 22 is a front elevational view of still another embodiment of a V-shaped roller member constructed in accordance with the teachings of the present invention showing a pair of tapped holes or bores associated therewith as well as a third tapped hole or bore located approximately perpendicular thereto at the apex of the V-shaped roller member.

FIG. 23 is a front elevational view of the V-shaped roller member of FIG. 22 rotated approximately 90° and showing the third tapped hole or bore extending therethrough.

FIG. 24 is a cross-sectional view taken along the line 24-24 of FIG. 17.

FIG. 25 is a partial side elevational view showing a typical Pittsburgh Seam after the seam has been closed by the V-shaped roller member of FIGS. 17-19.

FIG. 26 is a partial side elevational view showing a typical Pittsburgh Seam after the seam has been closed by the V-shaped roller member of FIGS. 20 and 21.

FIG. 27 is a partial side elevational view showing a typical Pittsburgh Seam after the seam has been closed by the V-shaped roller member of FIGS. 22 and 23.

FIG. 28 is a partial side elevational view illustrating a Pittsburgh Seam prior to closing having dimples or projections associated with the female portion thereof constructed in accordance with the teachings of the present invention.

DETAILED DESCRIPTION

Figure 1:
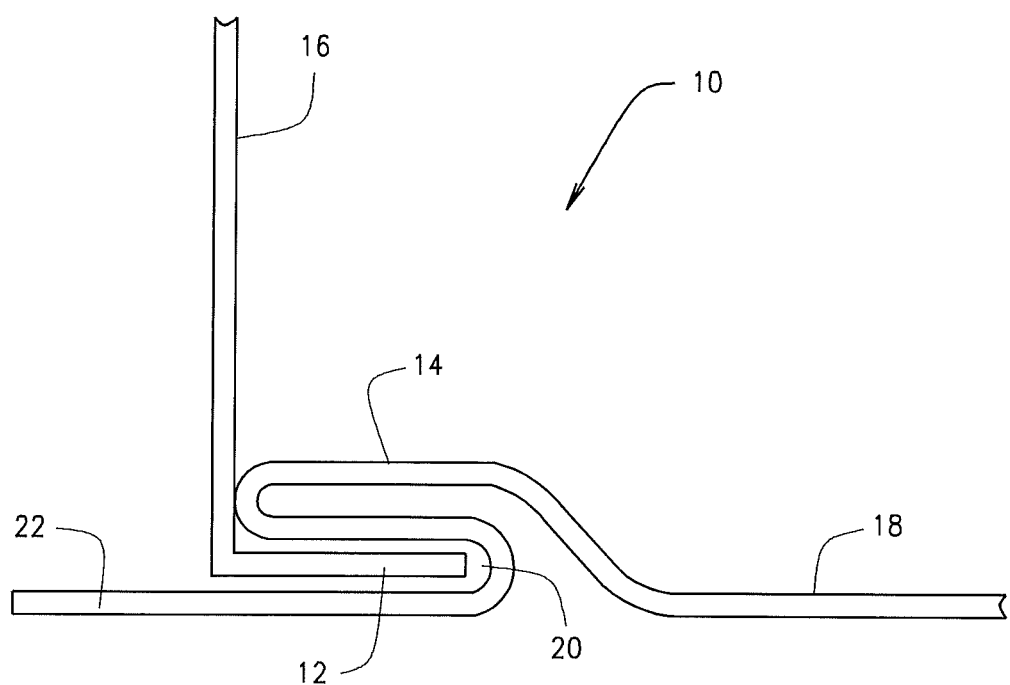
FIG. 1 is a partial side elevational view illustrating a standard Pittsburgh Seam prior to closing.

Referring to the drawings more particularly by reference numbers wherein like numerals refer to like parts, number 10 in FIG. 1 illustrates a standard Pittsburgh Seam having a male portion 12 and a female portion 14. The male portion 12 of the Pittsburgh Seam 10 is associated with one longitudinal edge of the sheet metal portion 16 forming one side of a typical duct section and the female portion 14 is associated with one longitudinal edge of another sheet metal portion 18 forming another side of a typical duct section. The male portion 12 is formed by bending the entire longitudinal edge of sheet metal portion 16 inwardly at approximately a right angle as illustrated in FIG. 1. The female portion 14 of the Pittsburgh Seam 10 includes a groove or slot 20 for receiving the male portion 12. The female groove 20 is formed by bending the entire longitudinal edge of sheet metal portion 18 into a Z-shaped or S-shaped bend as illustrated in FIG. 1. The female groove or slot 20 is formed as part of the Z-shaped or S-shaped bend and includes an overhanging edge portion 22 which extends beyond the partially formed seam when the male portion 12 is positioned within the female cavity 20. The overhanging edge portion 22 extends beyond sheet metal portion 16 and is designed to be bent inwardly so that it lies adjacent to sheet metal portion 16 when the seam 10 is closed and locked. The Pittsburgh Seam 10 illustrated in FIG. 1 is engaged but is not closed and locked. Bending of the overhanging edge portion 22 is required, either manually or through mechanical means, in order to close and lock the seam and the corresponding abutting sheet metal portions in order to form the duct section. When fully closed, the overhanging edge portion 22 will lie against and abut the outer surface of sheet metal portion 16.

Figure 2:
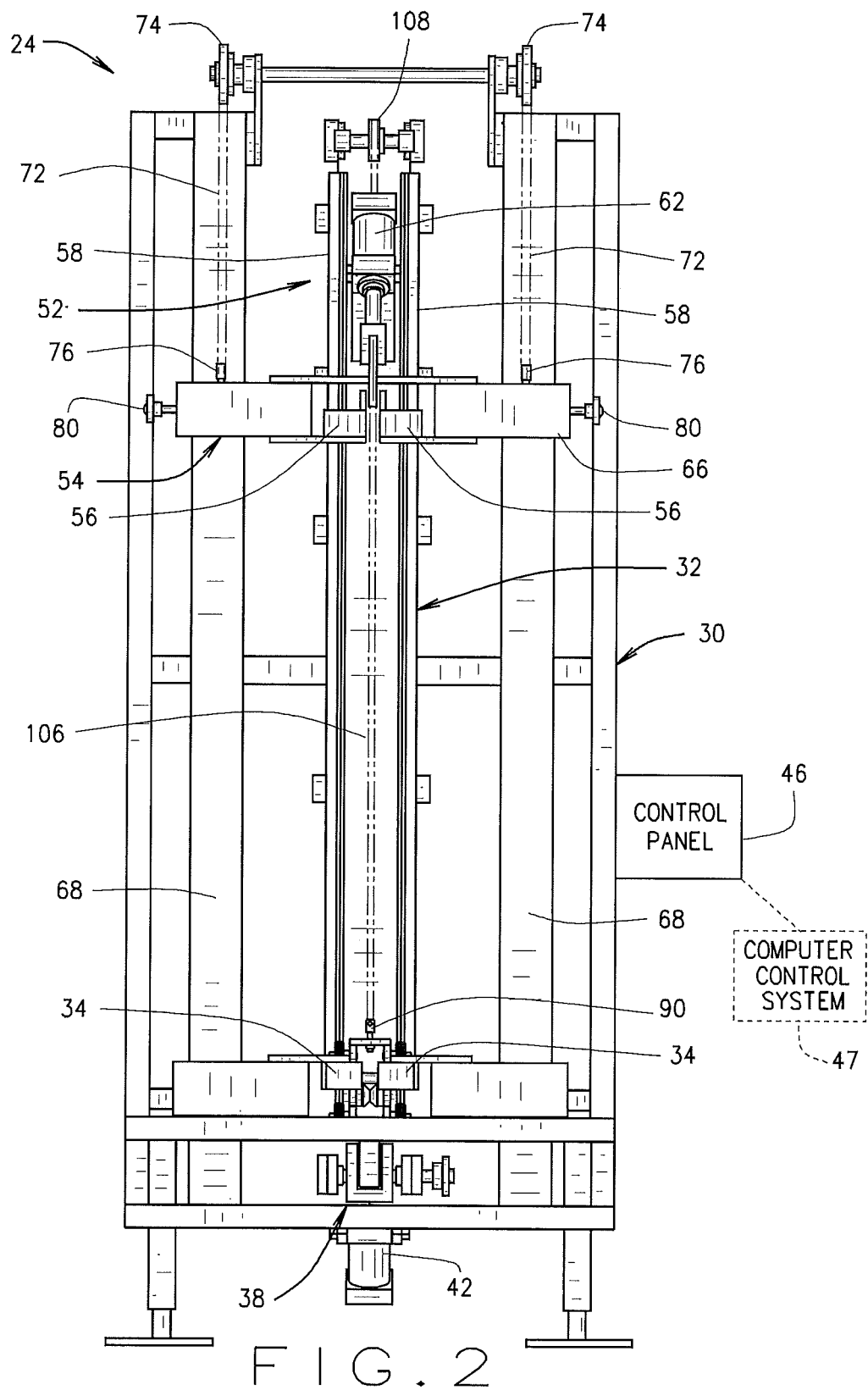
FIG. 2 is a front elevational view of a vertical Pittsburgh Seam closing apparatus constructed in accordance with the teachings of the present invention.
Figure 3:
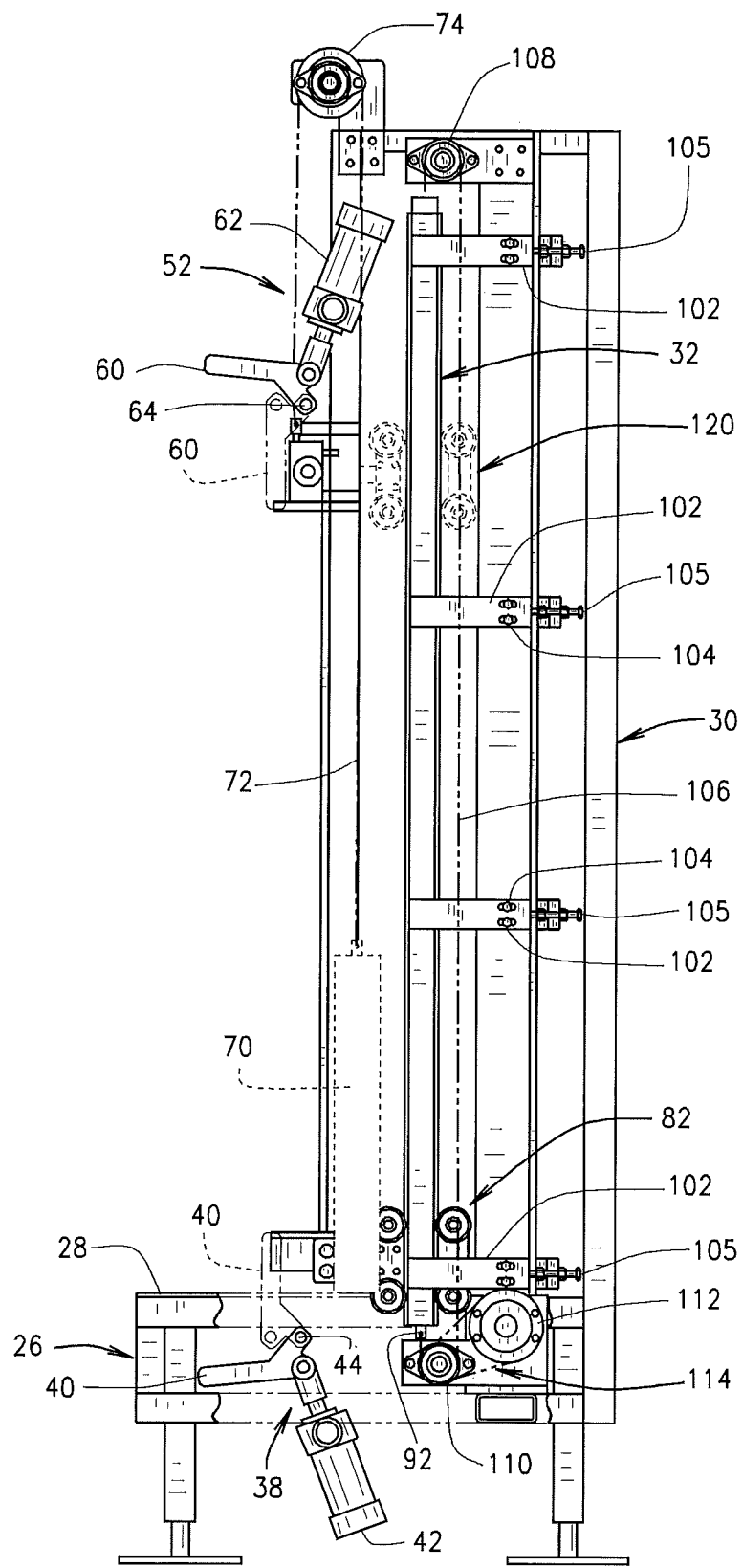
FIG. 3 is a side elevational view of the apparatus of FIG. 2.

FIGS. 2-10 illustrated one embodiment of a Pittsburgh Seam closing apparatus 24 constructed according to the teachings of the present invention. As best illustrated in FIGS. 2 and 3, the present apparatus includes a base member 26 having a supporting surface 28 associated therewith for positioning and locating thereon a duct section having a Pittsburgh Seam to be closed as will be hereinafter further explained. A suitable support framework structure 30 is fixedly attached to the base member 26 and includes a vertical track mechanism 32 for supporting and guiding movement of a seam forming roller carriage assembly 82 therealong for closing a Pittsburgh Seam as will be hereinafter further explained. The carriage assembly 82 includes the seam forming assembly 84 which is used to bend and close the Pittsburgh Seam 10.

Figure 4:
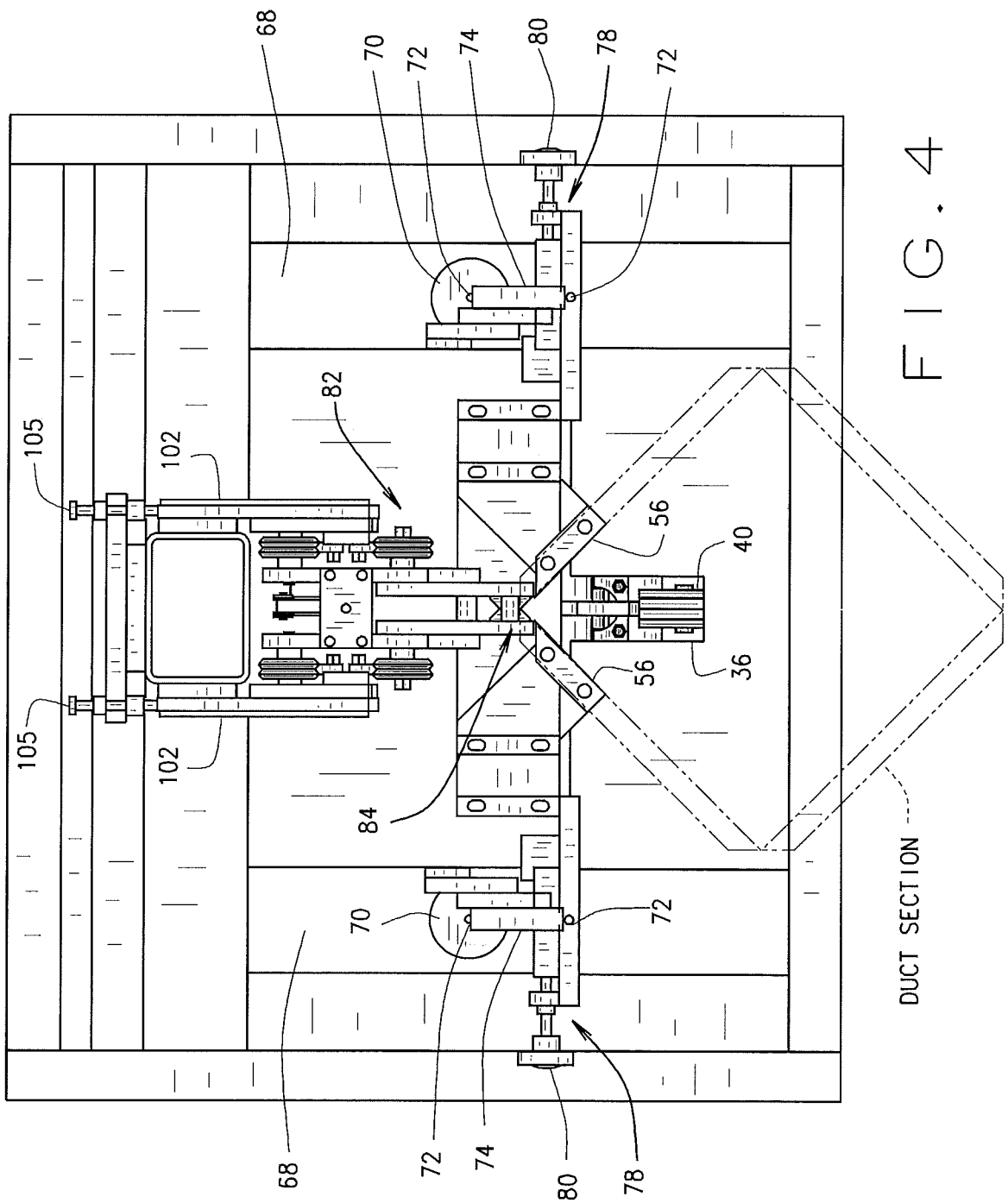
FIG. 4 is a partial top plan form view of the apparatus of FIGS. 2 and 3.
Figure 5:
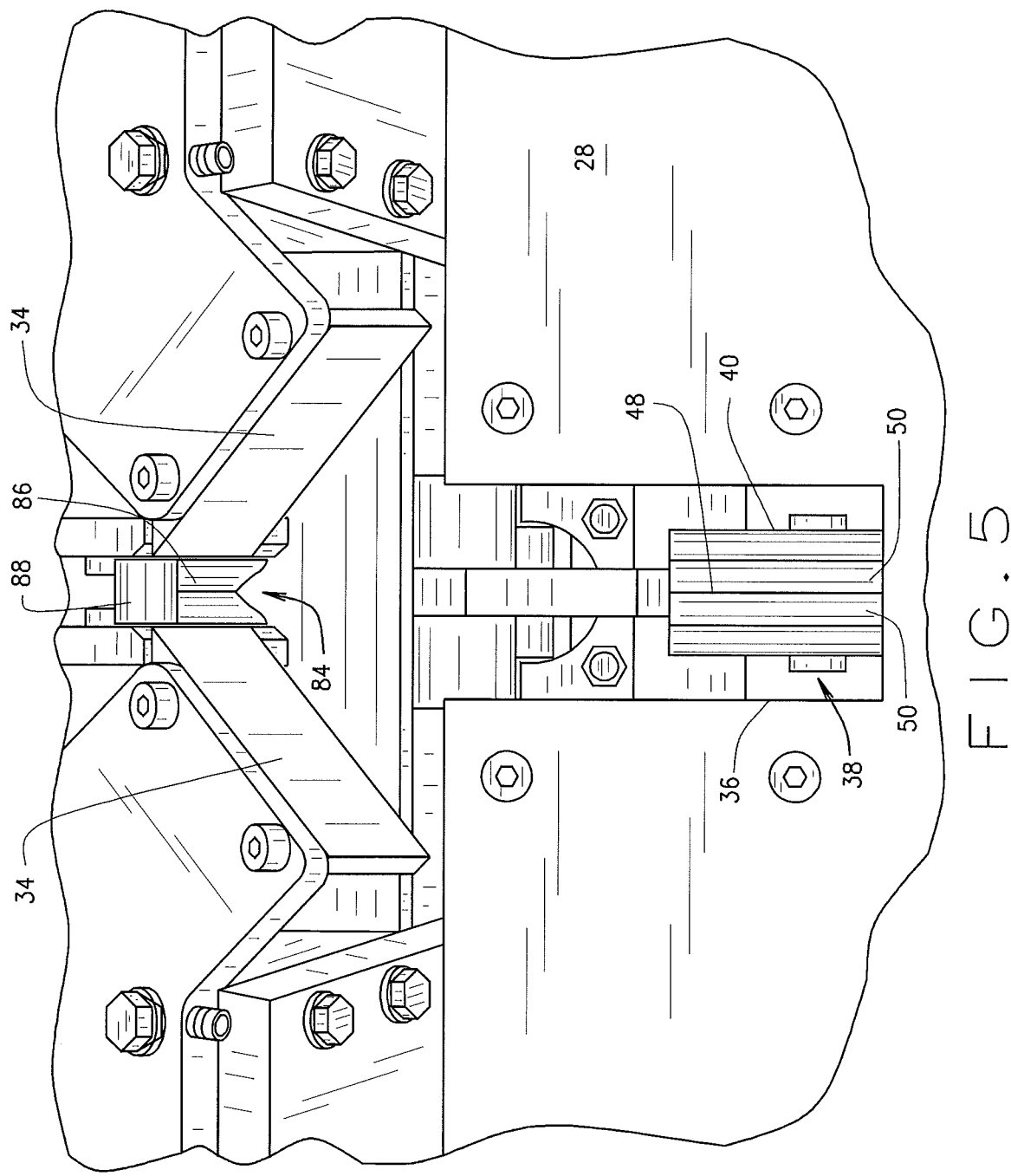
FIG. 5 is a partial perspective view of the lower V-shaped guide members, the lower clamp head assembly, and the seam forming assembly constructed in accordance with the teachings of one embodiment of the present invention.

The base member 26 includes a pair of lower guide members or clamp pads 34 positioned in spaced apart relationship relative to each other so as to form a "V" for guiding the duct section and its associated Pittsburgh Seam into proper positioning on the base member support surface 28 as best illustrated in FIGS. 4 and 5. FIG. 4 shows a typical duct section engaged with the upper guide members 56 as will be hereinafter further explained. Engagement of upper guide members 56 with a typical duct section in substantially identical to the engagement of lower guide members 34 with a typical duct section. The lower guide members 34 form a lower guide assembly and the members 34 are arranged at approximately a right angle to each other to receive a corner of a typical duct section. The V-shaped lower guide members 34 are fixedly attached to base member 26 and are adjustable in a conventional manner such as through the use of a screw and slot arrangement so as to ensure that the duct section is properly oriented relative to the seam forming assembly 84 as will be hereinafter described. In this regard, the V-shaped guide members 34 are positioned and located such that the seam forming assembly 84 associated with the carriage assembly 82 is positioned therebetween and such that the V-shaped lower guide members 34 and the initial positioning of the seam forming assembly 84 are located adjacent base member supporting surface 28 as best illustrated in FIG. 5. The V-shaped guide members 34 allow the duct section corner to be pressed into an interference fit with the seam forming assembly 84 and also provide proper orientation of the duct section relative to the assembly 84 as will be hereinafter further explained.

The base member 26 further includes an elongated slot or opening 36 associated with its support surface 28 for receiving a lower clamp head assembly 38 as best illustrated in FIG. 5. The elongated opening 36 is positioned and located in alignment with the seam forming assembly 84 and allows the clamping member 40 associated with the lower clamp head assembly 38 to be pivotally rotatable between an unclamped positioned wherein the clamping member 40 is recessed within the elongated opening 36 as illustrated in solid outline form in FIG. 3 and a clamping position where the clamping member 40 is moved to a vertical upright position as illustrated in dotted outline form in FIG. 3 so as to be positioned inside the duct section and adjacent the inside portion of the Pittsburgh Seam to be closed. As best illustrated in FIGS. 4 and 5A, when a duct section is positioned between the lower V-shaped guide members 34, the elongated opening 36 and the lower clamping member 40 recessed therein is located inside the duct section positioned thereover. In this regard, as best illustrated in FIG. 3, when in its unclamped position, the lower clamp member 40 can be located anywhere below the supporting surface 28 so as not to interfere with the placement and positioning of a duct section on the supporting surface 28 and between the lower guide members 34. As best illustrated in FIG. 3, the lower clamp head assembly 38 includes a clamp actuating cylinder 42 which is connected to clamping member 40 for pivotally rotating the clamping member about pivot axis 44. Rotation of the clamping member 40 about pivot axis 44 pivotally moves the clamping member 40 between its clamped and unclamped positions. The actuating cylinder 42 can be either hydraulically or pneumatically controlled from a control panel 46 (FIG. 2) associated with the present apparatus. It is also recognized and anticipated that the actuating cylinder 42 can be replaced with an electronically activated solenoid actuator or other suitable activator means. Movement of the actuating cylinder 42 and the relative positioning of the clamping member 40 is illustrated in FIGS. 2 and 5A.

The clamping member 40 includes a specially configured mating surface as best illustrated in FIGS. 5 and 5A for improving the clamping connection between the inside portion of the Pittsburgh Seam 10 (FIG. 1) and the clamping member 40. In this regard, the mating surface of the clamping member 40 includes an edge portion 48 positioned and located in alignment with the corner of the duct section and the corner of the Pittsburgh Seam 10 when the clamping member is moved to its clamping position. A notched portion 50 is located on either side of the edge portion 48 and is shaped and configured so as to make clearance for and receive the Z-shaped or S-shaped female portion 14 of the Pittsburgh Seam when the clamping member 40 is in its clamped position as shown in FIG. 5A. Depending upon which side of the duct section corner the female portion 14 of the Pittsburgh Seam lies, one of the notched portions 50 of the clamping member 40 will allow for and receive the female portion 14. As a result, orientation of the female portion 14 of the Pittsburgh Seam 10 when positioned between the lower guide members 34 is not critical since the female portion 14 will be located on either the left or right side of the seam and one of the notched portions 50 will receive the female portion 14. This configuration therefore enables the clamping member 40 to properly engage and support the inside portion of the Pittsburgh Seam 10 regardless of the orientation of the seam and regardless of which side of the seam the female portion 14 is located. Still further, this configuration likewise provides additional support to the female portion of the seam at the point of clamping since one of the notched portions 50 will be in close relationship with the female portion 14 of the Pittsburgh Seam 10 thereby substantially preventing movement of the duct section and seam relative to the clamping member 40 during the closing process.

A similarly constructed upper clamp head assembly 52 is mounted on a selectively movable and adjustable assembly 54 such that the entire upper clamp head assembly 52 can be moved and adjusted to accommodate any duct section length as best illustrated in FIG. 2. The upper clamp head assembly 52 likewise includes a pair of V-shaped upper guide members 56 forming an upper guide assembly which is positioned in vertical alignment with the lower guide members 34 for likewise guiding the upper portion of the duct section into proper position on the present apparatus 24 as best illustrated in FIG. 4. The upper V-shaped guide members 56 are likewise fixedly attached to assembly 54 and are likewise adjustable in a conventional manner as previously explained with respect to the lower guide members 34. The upper clamp head assembly 52 is mounted to assembly 54 through the use of plate members 58 and other supporting structure and likewise includes an upper clamping member 60 which is pivotally movable similar to the lower clamping member 40 through the use of an actuating cylinder 62 (FIG. 3) which can be likewise controlled from control panel 46. Like clamp actuating cylinder 42, actuating cylinder 62 is connected to clamping member 60 for pivotally rotating the clamping member 60 about pivot axis 64. The upper clamping member 60 is substantially identical in shape and configuration to lower clamping member 40 and is likewise pivotally rotatable between an unclamped position as illustrated in solid outline form in FIG. 3 and a clamping position wherein the clamping member 60 is again positioned inside the duct section and adjacent the inside portion of the Pittsburgh Seam 10 to be closed as illustrated in dotted outline form in FIG. 3. The actuating cylinder 62 can likewise be electrically, hydraulically or pneumatically controlled from control panel 46 and once a particular duct section is positioned within both the lower and upper guide members 34 and 56 respectively, and once the lower and upper clamping members 40 and 60 respectively are moved to their clamping positions, the duct section is properly oriented and positioned on the present apparatus 24 and is ready for operative sealing of the Pittsburgh Seam 10. In addition, like clamping member 40, the mating portion of clamp member 60 with the inside portion of the Pittsburgh Seam 10 is likewise specially configured as discussed with respect to clamping member 40 to include an edge portion 48 and corresponding notched portions 50 so as to enable the upper clamping member 60 to likewise properly receive and support the inside portion of the Pittsburgh Seam regardless of the orientation of the female portion 14 of the Pittsburgh Seam 10 as illustrated in FIG. 5A.

The upper clamp head assembly 52, as discussed, is mounted on a selectively movable assembly 54 which includes horizontal support member 66 which is vertically movable along the entire length of the pair of upright support members 68 as best illustrated in FIG. 2. Vertical support members 68 are at least partially hollow and each includes a counter balance weight 70 which is attached to a respective chain or other suspension mechanism 72 (FIGS. 2 and 3). Chain mechanism 72 has one end portion attached to a respective counter balance weight 70 and is fed over a respective idler assembly 74 so as to have its opposite end portion attached to a respective attachment point 76 associated with support member 66. As best illustrated in FIG. 2, a pair of attachment points 76 are associated with support member 66 and are positioned and located at a location in alignment with the upright support members 68. The opposite end portions of support member 66 each include a releasable holding and clamping mechanism 78 as best illustrated in FIG. 4 for releasably holding the support member 66 and the entire movable assembly 54 at a fixed vertical location along the length of vertical support members 68.

As illustrated in FIG. 4, one embodiment of a releasable clamping and holding mechanism 78 can take the form of a threaded screw or pin member 80 which can be selectively releasably tightened against the respective vertical support members 68 or other structure associated with assembly 54 for holding each opposite side of support member 66 at a fixed vertical position along the length of the support members 68. Likewise, releasing the threaded members 80 by simply unthreading such members will allow the support member 66 to move and slide vertically along the entire length of the vertical support members 68 so that an operator can adjust the member 66 and its associated upper guide members 56 relative to the top portion of a particular duct section to be seamed based upon its particular length. The counter balance weights 70 are appropriately weighted based upon the weight of the entire upper clamp head assembly 52 and its associated assembly 54 such that a single operator can easily move support member 66 along the members 68 once the clamping mechanisms 78 are released. This enables an operator to quickly and easily move and adjust the upper clamp head assembly 52 and the upper guide members 56 which are associated therewith so as to accommodate duct sections of any length within the overall length of vertical support members 68.

Once the particular duct section is properly positioned on supporting surface 28 and within the lower guide members 34, the upper clamp head assembly 52 can be adjusted so as to move the upper guide members 56 into contact with the upper end portion of the particular duct section to be seamed and the support members 66 and assembly 54 can then be clamped and secured at that vertical location through the use of the clamping mechanism 78. Once the upper clamp head assembly 52 is properly positioned and oriented relative to the top portion of the duct section to be closed, the upper clamping member 60 can be moved to its clamping position. It is recognized and anticipated that any counter balance weight type arrangement and suspension mechanism can be utilized to allow a single operator to easily and quickly adjust the upper clamp head assembly 52 to accommodate any length of duct section including non-standard and odd sized duct sections. It is also recognized and anticipated that any type of selectively releasable clamping system such as clamping system 78 can be utilized to easily lock and unlock support member 66 along the length of vertical support members 68, and it is recognized and anticipated that any type of guide or tracking system for allowing support member 66 to slidably move along the length of vertical support members 68 can likewise be utilized without departing from the spirit and scope of the present invention.

Figure 8:
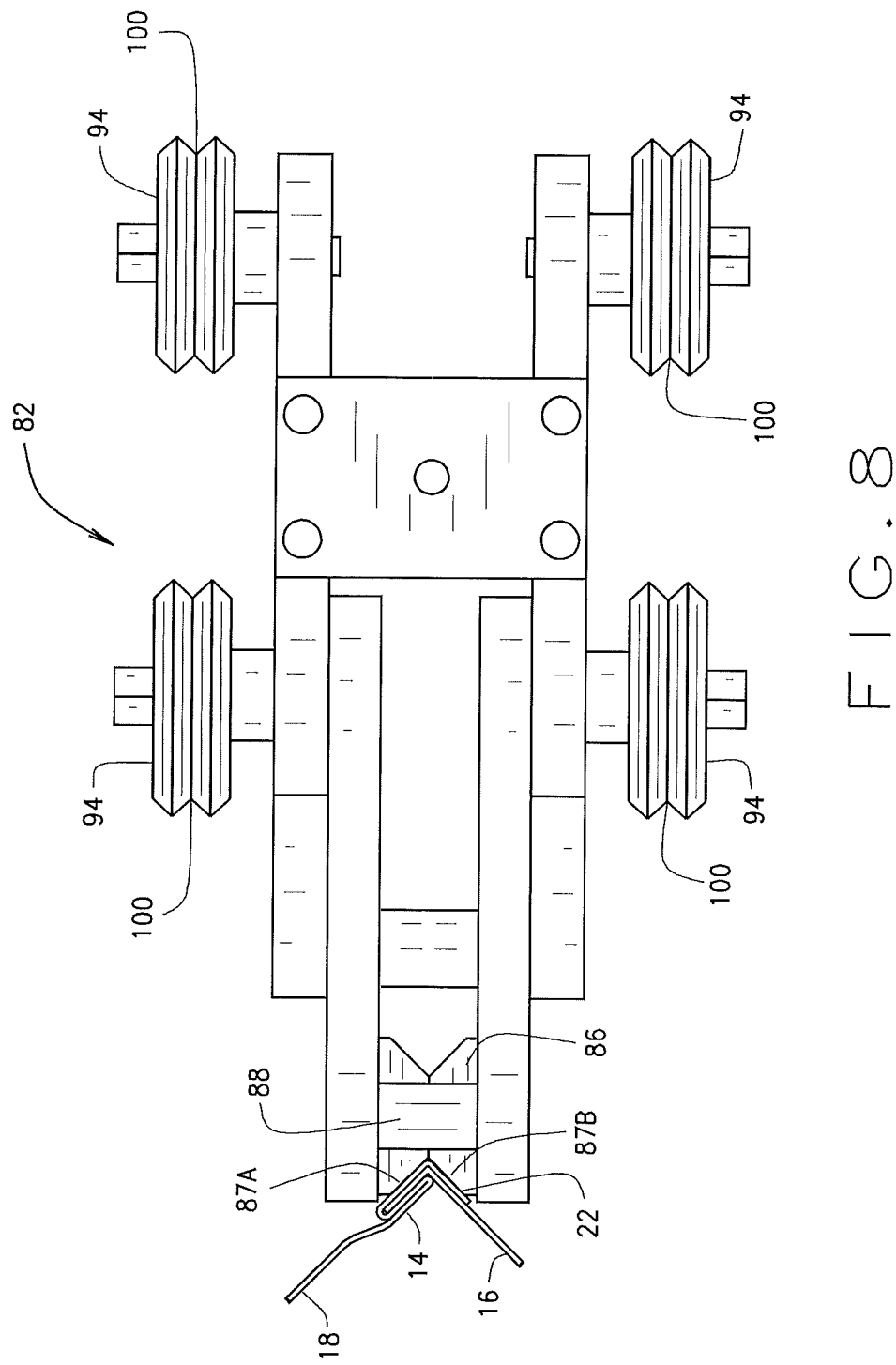
FIG. 8 is a top plan form view of the carriage assembly illustrated in FIGS. 6 and 7 showing a typical Pittsburgh Seam engaged with the roller assembly after the seam has been closed.

FIGS. 6 and 7 illustrate one embodiment of a carriage system 82 which includes one embodiment of the present seam forming assembly 84. The embodiment illustrated in FIGS. 6 and 7 includes an assembly 84 having a pair of roller members 86 and 88 mounted in vertical arrangement relative to each other (FIG. 6), the lower roller member 86 being substantially V-shaped in configuration and the upper roller member 88 being substantially cylindrical in shape. The V-shaped roller member 86 enables the Pittsburgh Seam 10 to be positioned within the lower and upper guide members 40 and 60 in any of the two possible orientations discussed above, namely, with the female portion 14 of the Pittsburgh Seam 10 located on either side of the seam corner as illustrated in FIGS. 5A and 8 as will be hereinafter further explained. Both seam forming roller members 86 and 88 are positioned on the movable carriage assembly 82 which is guided on a vertical track system 32 through the use of a chain and sprocket type assembly which is powered in a conventional manner through the use of a drive motor 112 (FIG. 3) as will be hereinafter explained. The seam forming carriage assembly 82 includes a pair of chain attachment pins 90 and 92 (FIG. 7) and a plurality of guide wheels 94. In the particular embodiment illustrated in FIGS. 3, 4, 6 and 7, the carriage assembly 82 includes eight guide wheels 94.

Each guide wheel 94 associated with carriage assembly 82 is positioned and located to track and guide along a vertical track mechanism 32 which includes a pair of track members 96 as best illustrated in FIG. 9, each track member 96 having an edge portion 98 as best illustrated in FIG. 10 which is configured to mate with a corresponding groove 100 associated with each guide wheel 94 (FIGS. 6 and 8). Track edge portion 98 is illustrated as being pointed or wedge shaped so as to be cooperatively received and engaged within the corresponding groove 100 associated with each guide wheel 94. In this regard, it is recognized and anticipated that the groove 100 could be associated with each respective track 96 and that the wedge shaped or pointed edge portion 98 could be associated with each respective guide wheel 94. It is also recognized and anticipated that other corresponding shapes and configurations for holding the guide wheels in positive mating relationship with the tracks 96 could likewise be utilized in the present invention. The track members 96 are likewise adjustable fore and aft relative to the lower and upper guide plates 34 and 56 through the use of a plurality of adjustable bolt plates 102 to which the tracks 96 are fixedly attached as best illustrated in FIGS. 3 and 9. Attachment plates 102 include a plurality of elongated slots 104 which enable the respective plate members 104 to be moved horizontally fore and aft so as to change the position of the assembly 84 and its corresponding roller members 86 and 88 relative to the Pittsburgh Seam to be closed. This adjustability can be accomplished by any suitable adjustment means such as through the use of adjustment pins 105 (FIGS. 3 and 4) and allows an operator to increase or decrease the force applied and interference between the seam forming roller members 86 and 88 and the Pittsburgh Seam associated with the duct section clamped into position on the present apparatus 24.

As best illustrated in FIGS. 2 and 3, a chain member or other suspension member 106 has one end portion attached to the adjustment pin 90 associated with carriage 82 and has its opposite end portion attached to adjustment pin 92 associated with the opposite end portion of carriage assembly 82. Chain member 106 is fed over and traverses idler assembly 108 and is driven by transfer shaft member 110 as best illustrated in FIG. 3. Transfer shaft member 110 is driven by drive motor 112 and an associated chain and sprocket mechanism 114 associated with drive motor 112 and transfer shaft 110 (FIG. 3). Drive motor 112 through the mechanism 114 will move and rotate transfer shaft member 110 in either a clockwise or counterclockwise direction which in turn will move chain member 106 about idler assembly 108 so that the entire carriage assembly 82 can be moved up and down vertical track mechanism 32. It is recognized and anticipated that any drive mechanism and any sprocket/idler arrangement can be used to move the seam forming carriage assembly 82 vertically along track mechanism 32. Activation of the drive motor 112 and movement of the carriage assembly 82 can be activated by an operator through the control panel 46.

When activated, the carriage assembly 82 carrying the seam forming roller assembly 84 moves in a vertical direction from its lower start position adjacent the lower guide members 34 as illustrated in FIGS. 2 and 3 to an upper position determined by the positioning and location of the upper clamp head assembly 52 and support member 66. As the seam forming assembly 84 moves in an upward direction, the substantially cylindrically shaped roller member 88 initially bends the overhanging seam edge portion 22 approximately 45° and then the bottom V-shaped roller member 86 completes the closing of the seam and moves the overhanging edge portion 22 into a tight abutting relationship with the outer surface of the duct section such as duct section 16 illustrated in FIGS. 1 and 8. Because of its V-shaped configuration, one side of the V-shaped roller member 86 such as side portion 87A will overlay and lie in engagement with the female portion 14 of a typical Pittsburgh Seam 10 and one side of the V-shaped roller member 86 such as side portion 87B will overlay the opposite side of the Pittsburgh Seam 10 as best illustrated in FIG. 8. In this regard, FIG. 8 shows a typical Pittsburgh Seam 10 positioned within the V-shaped roller member 86 after the overhanging edge portion 22 has been closed and moved adjacent to the outer surface of duct section 16.

It is important to note that the side of the V-shaped roller member 86 not being used to form or close the seam, for example, side portion 87A adjacent the female portion 14, holds one side of the duct section and supports that side of the duct section so that the opposite side of the roller member 86, namely, side portion 87B, presses against the overhanging edge portion 22 to create the bending or forming force. In other words, one side of the V-shaped roller member 86, such as side portion 87A, holds the duct section in proper position while the other side of the V-shaped roller member, such as side portion 87B, actually bends the overhanging edge portion 22 into its closed position. As a result, it makes no difference if the overhanging edge portion of a typical Pittsburgh Seam 10 extends in a direction corresponding to either side 87A or 87B of the V-shaped roller member 86 since one side of the roller member 86 will bend the Pittsburgh Seam while the other side will provide sufficient support and force for completing the bending or forming action along the entire length of the seam. Since the carriage assembly 82 moves upwardly from its lower start position as illustrated in FIGS. 2 and 3 along the entire length of the duct section and associated Pittsburgh Seam to be closed, the V-shaped roller member 86 supports the closing seam along its entire length. This is a substantial improvement over known existing Pittsburgh Seam closing apparatus which typically do not provide adequate support for closing the seam along the entire length of the seam.

When the seam forming assembly 84 reaches the upper clamping member 60 which holds the top portion of the duct section and the associated Pittsburgh Seam to be closed in proper position on the present apparatus 24, the carriage assembly 82 is returned to its lower start position and again traverses the full length of the seam. During this return run, the seam forming assembly 84 will re-form the metal of the Pittsburgh Seam which was closed during its upward travel, if necessary, so as to remove any waves or wrinkles in the duct section. Because the V-shaped roller member 86 presses and supports the Pittsburgh Seam on all sides of the seam during the closing process along the entire length of the seam to be closed, any waves or wrinkles in the edge being seamed are removed by the reformation of the material which results in a smooth and attractive seam. If any waves or wrinkles do occur, the reverse travel of the roller assembly 84 will again re-form the metal of the seam so as to remove any such waves or wrinkles. Once the seam has been closed and the carriage assembly 82 has been returned to its initial lower position adjacent base supporting surface 28, the lower and upper clamp head assemblies 38 and 52 are moved to their unclamped position, and the duct section can be removed and/or rotated so that another seam can be positioned on the present apparatus 24 for closure.

Due to the position of the roller member 88 on top of roller member 86, initial peening of both opposite ends of the Pittsburgh Seam to be closed is still required. This initial peening on the end of the seam to be positioned adjacent the lower guide members 34 should be over a length not substantially greater than the diameter of the V-shaped roller member 86 whereas the initial peening of the opposite end of the seam to be positioned adjacent the upper guide numbers 56 may be over a length slightly greater than the lower end since roller member 86 will lie below roller member 88 at the top of its travel along track system 32. This initial peening of the respective starting ends of each Pittsburgh Seam to be closed also preliminarily holds the duct portions together prior to positioning a particular duct section on supporting surface 28.

FIGS. 11 and 12 illustrate another embodiment 116 of the present seam forming assembly wherein the top substantially cylindrical roller member 88 associated with assembly 84 is replaced with a flat plate or wiper block 118 which is positioned and located above the V-shaped roller member 86 to again bend the overhanging edge portion 22 of a typical Pittsburgh Seam 10 at least approximately 45° as previously explained with respect to embodiment 84. In all other respects, the seam forming assembly 116 is substantially identical to and functions substantially similar to seam forming assembly 84. In addition, the flat plate or wiper block 118 can likewise be replaced with any object which is shaped and configured so as to bend the overhanging edge portion 22 of a typical Pittsburgh Seam 10 as previously explained. Any object and any configuration of such object which will achieve bending of the overhanging edge portion 22 to approximately a 45° angle will achieve the stated purpose and will allow the V-shaped forming roller 86 to complete the seaming process.

In still another embodiment of the present vertical Pittsburgh Seam closure apparatus, a second seam forming carriage assembly similar to carriage assembly 82 such as carriage assembly 120 illustrated in dotted outline form in FIG. 3 can be positioned adjacent the upper guide members 56 in a substantially similar arrangement as disclosed with respect to lower guide members 34 and seam forming assembly 84. In this embodiment, the second or upper seam forming carriage assembly 120 can be operable independent of the lower seam forming carriage assembly 82 such that a dual carriage system can be achieved. Each carriage system would have its own seam forming assembly associated therewith such as seam forming assembly 84 and each carriage assembly would traverse only a portion of the full length of the Pittsburgh Seam to be closed. In this particular embodiment, the lower seam forming carriage assembly such as carriage assembly 82 can be moved upwardly so as to traverse the vertical track mechanism 32 a distance less than the full length of the duct section to be seamed and the upper seam forming carriage assembly such as carriage assembly 120 can be moved downwardly so as to traverse the track mechanism 32 a distance less than the full length of the duct section to be seamed, this downward travel distance of the second carriage assembly overlapping at least a portion of the seaming process accomplished by the lower carriage assembly 82 so as to ensure complete seaming of the Pittsburgh Seam to be closed. In this embodiment, it is envisioned that the lower carriage assembly 82 would operate independently and would move upward along the vertical track mechanism 32 to a predetermined height along the length of the seam to be closed and once reaching its predetermined height, the lower carriage assembly 82 would return to its initial start position. During the return travel of the lower carriage assembly, or once the lower carriage assembly reaches its initial start position, movement of the second upper carriage assembly 120 can occur. In similar fashion, the upper carriage assembly will move downwardly along the vertical track mechanism 32 to a predetermined location along the length of the seam to be closed, such predetermined location including some overlap with the distance traversed by the lower carriage assembly 82. When both carriage systems return to their initial start position, the seaming process is completed.

The timing of the independent movement of the dual carriage system can be computer controlled or manually controlled through control panel 46. The configuration of the upper carriage assembly 120 will be substantially identical to the lower carriage assembly 82 and lower seam forming assembly 84 as previously described except that the V-shaped roller member such as roller member 86 will be positioned above roller member 88 or plate member 118 thereby allowing the seam forming assembly to be positioned closer to the terminal end of the seam to be closed at its upper end portion. This results in less peening of that particular seam end portion as compared to the embodiment where a single seam forming carriage assembly 82 is utilized.

The second or upper carriage assembly 120 will move on the same track system 32 as lower carriage assembly 82 via a substantially similar chain and sprocket assembly as described with respect to carriage assembly 82. In this regard, a separate and independent drive motor and chain and sprocket assembly can be utilized to drive the second upper carriage assembly 120 and such chain and sprocket assembly can be positioned in parallel relationship to chain mechanism 106. Various portions of the upper carriage assembly may be configured slightly differently as compared to the lower carriage assembly 82 such as the location and structure associated with the chain attachment pin members 90 and 92 so as to accommodate a parallel chain or suspension mechanism. It is likewise recognized and anticipated that still other means for moving the second carriage assembly on the same track mechanism 32 as the lower carriage assembly 82 can be utilized and are envisioned without departing from the spirit and scope of the present invention.

It is also recognized that the various systems associated with the present apparatus 24 such as moving the clamping members 40 and 60 between their unclamped and clamped positions and moving the lower carriage assembly 82 and/or the upper carriage assembly 120 along track mechanism 32 can be computer controlled and programmed such as through a computer control system 47 (FIG. 2) coupled to the present apparatus 24 such as through control panel 46 such that movement of these assemblies will automatically take place upon proper positioning of the duct section within the guide members 34 and 56, or upon activation of a start switch associated with control panel 46. It is also recognized that each step of the seam closing process can likewise be manually operated by a single operator from control panel 46. In this regard, appropriate switches and valves for operating the actuators 42 and 62 and the drive motor 112 can be controlled independently from control panel 46. It is also recognized that movement of the lower carriage assembly 82 and/or an upper carriage assembly 120 can be controlled by a manual switch associated with control panel 46 and reversing of the lower carriage assembly 82 and/or the upper carriage assembly can be controlled either manually through control panel 46 or mechanically through the use of appropriate sensors and/or contact switches for stopping movement in one direction and starting movement in the reverse direction. Still other fully automated and/or partially automated control systems for operating the present apparatus 24 are likewise recognized and anticipated.

It is also important to note that the forming roller members 86 and 88 are on shaft portions which have diameters substantially larger than shafts typically associated with the industry standard, and typically associated with the roll forming members associated with known seam closing devices. In many instances, the known roller members are associated with small threaded camshafts which are subject to easy breaking due to the forces generated during the Pittsburgh Seam closing process. As illustrated in FIGS. 7 and 11, the present roller members 86 and 88 are designed so as to increase the strength of the respective shafts, and the shafts associated with such roller members are not threaded, which threads reduce the overall diameter of the shaft. Instead, the present roller members are made with integral shafts of a much larger diameter that is approximately 10 times stronger than existing cam roller stems used on known machines in the marketplace. The shafts run in large self aligning bearings. This arrangement is capable of withstanding forces required for closing Pittsburgh Seams made of 18 gauge stainless steel and 16 gauge mild steel. This strengthening of the roller members 86 and 88 prevents premature breakage of such roller members and greatly increases the longevity and efficiency of the seam closing process. This increased strength associated with the forming roller members in conjunction with the support provided by the V-shaped roller member 86 to all sides of the Pittsburgh Seam during the seam closing process allows the present apparatus 24 to successfully close Pittsburgh Seams made of metal from extremely light gauge metal such as 26 gauge metal through heavy gauge metal such as 16 gauge metal without the need to adjust the roller members for a tighter or looser setting. The use of the present lower and upper V-shaped guide members 34 and 56 in conjunction with the improved lower and upper clamp members 40 and 60 likewise contribute to the successful seaming of a wide variety of different gauge materials from extremely light to heavy gauge metal as previously described.

Figure 14:
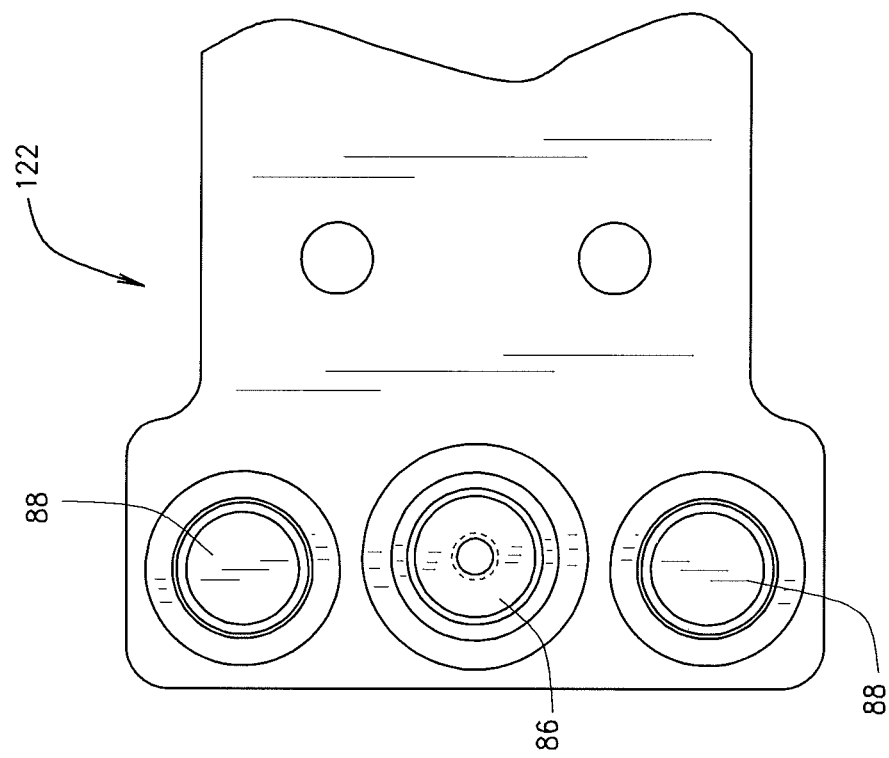
FIG. 14 is a partial side elevational view of the carriage assembly of FIG. 13.
Figure 13:
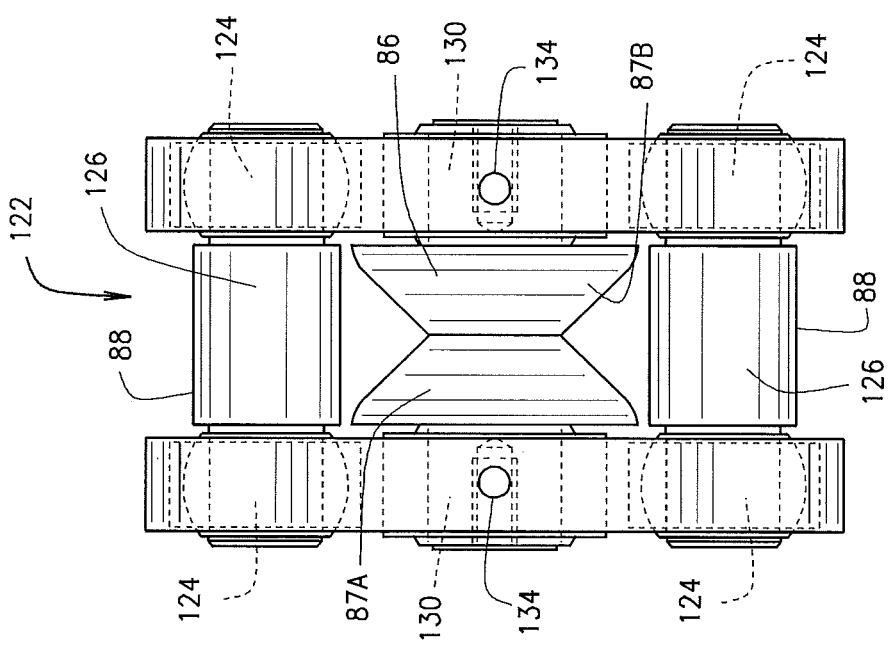
FIG. 13 is a partial front elevational view of another embodiment of a seam forming carriage assembly constructed in accordance with the teachings of the present invention.

FIGS. 13 and 14 illustrate still another embodiment of a carriage system 122 which includes three roller members 86 and 88 mounted in vertical arrangement relative to each other, the lower roller member 88 being substantially cylindrical in shape, the middle or center roller member 86 being substantially V-shaped in configuration, and the upper roller member 88 being again substantially cylindrical in shape. The roller members 86 and 88 are substantially identical to the roller members utilized in carriage assembly 82 (FIGS. 6 and 7), the only difference being that a roller member 88 has been positioned both above and below the V-shaped roller member 86. All three seam forming roller members 86 and 88 are positioned on the movable carriage assembly 122 which is guided on the same vertical track system 32 as previously explained. The carriage assembly 122 is likewise substantially identical in structure, configuration, function and operation as carriage assembly 82 and includes chain attachment pins (not shown) such as the attachment pins 90 and 92 as well as a plurality of guide wheels (not shown) such as the guide wheels 94 illustrated in FIGS. 6 and 7. Except for the use of two substantially cylindrical roller members 88, one above and one below the V-shaped roller member 86, carriage member 122 is substantially identical in all respects as previously described with respect to carriage assembly 82.

Carriage assembly 122 is more efficient than carriage assembly 82 and the dual carriage system utilizing carriage assemblies 82 and 120 explained above since carriage assembly 122 can accomplish complete closure of a typical Pittsburgh Seam in a single pass in either direction, that is, either from its lower starting point to its upper finishing point, or from its upper finishing point to its lower starting point. In essence, carriage assembly 122 incorporates the features of carriage assemblies 82 and 120 discussed with respect to the dual carriage system and rolls these features into a single carriage unit. When activated, the carriage assembly 122 moves in a vertical direction from its lower start position adjacent the lower guide members 34 to an upper position determined by the positioning and location of the upper clamp head assembly 52 and support member 66. As the carriage assembly 122 moves in an upward direction, the substantially cylindrically shaped upper roller member 88 initially bends the overhanging seam edge portion 22 approximately 45° and then the center or middle V-shaped roller member 86 completes the closing of the seam and moves the overhanging edge portion 22 into a tight abutting relationship with the outer surface of the duct section as previously explained with respect to carriage assembly 82. The side portions 87A and 87B of the V-shaped roller member 86 function as previously explained with respect to carriage assembly 82, that is, the side portion of the V-shaped roller member 86 not being used to form or close the seam, for example, side portion 87A adjacent the female portion 14, holds one side of the duct section and supports that side of the duct section so that the opposite side portion of the roller member 86, namely, side portion 87B, presses against the overhanging edge portion 22 to create the bending or forming force. The function and operation of the V-shaped roller member 86 and the upper substantially cylindrically shaped roller member 88 is identical to that previously explained with respect to carriage assembly 82. The lower or bottom substantially cylindrically shaped roller member 88 will function to add more stability to the carriage assembly 122 during the closing process and during the application of the bending and forming forces but it will not interfere with the seam closing process during upward travel of the carriage assembly 122. Once carriage assembly 122 reaches its upper position, the Pittsburgh Seam has been fully closed and the duct section can be removed and/or rotated so that another seam can be positioned on the present apparatus 24 for closure.

Still further, and importantly, since carriage assembly 122 includes a substantially cylindrically shaped roller member 88 both above and below the V-shaped roller member 86, the lower substantially cylindrically shaped roller member 88 will now function to initially bend the overhanging seam edge portion 22 approximately 45° when the carriage assembly 122 is moved downwardly in a vertical direction from its upper position to its lower start position and the middle or center V-shaped roller member 86 will then again complete the closing of the seam as the carriage assembly 122 moves to its initial start position. During this return run, the upper substantially cylindrically shaped roller member 86 now functions to add more stability to the carriage assembly 122 during the closing process but it will not interfere with such process during the downward travel of the carriage assembly 122. As a result, carriage assembly 122 can complete the closing of a Pittsburgh Seam both during its upward travel as well as during its downward or return travel thereby eliminating the return travel of carriage 82 as well as the more complicated dual carriage system utilizing carriage assemblies 82 and 120. This results in more efficient use of the present apparatus and increases the productivity of the machine since a Pittsburgh Seam can be closed in a single pass in either direction both during its upward travel as well as during its downward travel.

FIGS. 15 and 16 illustrate one embodiment of the substantially cylindrically shaped roller member 88 utilized in carriage assemblies 82, 120 and 122. Side end portions 124 of roller member 88 form shaft portions for mounting to the carriage assemblies 82, 120 and 122. Shaft portions 124 can be formed so as to be of a slightly smaller diameter as compared to the center roller portion 126, the shaft portions 124 being substantially larger than the known prior art as previously explained. The shaft portions 124 are cooperatively receivable within the side plates associated with the respective carriage assemblies such as carriage assembly 122 as best illustrated in FIG. 13. It is also recognized and anticipated that the roller members 88 could be substantially the same diameter throughout their entire length, and that other configurations are likewise possible.

It is also recognized that the substantially cylindrically shaped roller members 88 utilized in carriage assembly 122 can likewise be replaced with a flat plate or wiper block 118 as previously described with respect to FIGS. 11 and 12. In this regard, the flat plates or wiper blocks 118 would function and operate in the same capacity as roller members 88 to complete the sealing of a typical Pittsburgh Seam in a single pass in either direction. Here again, roller members 88 can be replaced with any object that is shaped and configured so as to initially bend the overhanging edge portion 22 of a typical Pittsburgh Seam 10 to approximately a 45° angle as previously explained so as to allow the V-shaped roller member 86 to complete the seaming process.

FIGS. 17-19 illustrated another embodiment 128 of a V-shaped roller member constructed in accordance with the teachings of the present invention which could be utilized with any of the carriage assemblies 82, 120 and 122. V-shaped roller member 128 is substantially similar to roller member 86 and includes side portions 87A and 87B as well as shaft portions 130 for mounting to the side plates associated with carriage assemblies 82, 120 and 122 as best illustrated in FIG. 13. The mounting and attachment of the V-shaped roller member 128 as well as roller member 86 can be accomplished in any conventional manner such as through the use of tapped bores and/or holes 132 and 134 which are adapted to receive cooperatively engageable members such as set screws and the like. The novel difference between the V-shaped roller member 86 and roller member 128 lies in the use of a center opening or bore 136 which is positioned and located at the apex or joinder of the two side portions 87A and 87B of the V-shaped roller member 128. The opening 136 is preferably drilled and tapped for receiving one or more set screws 138 as best illustrated in FIG. 24. The opening 136 is preferably threaded so as to receive at least one threaded set screw 138 which can be positioned such that at least a portion 140 of at least one set screw 138 extends at least slightly beyond the adjoining outer surfaces of side portions 87A and 87B, or slightly beyond the perimeter of such surfaces, such that as the roller member 128 moves along the outer female portion 14 during the seam closing process, the portion 140 of the extending set screw 138 will form a dimple or cavity in the female portion 14 at spaced locations therealong thereby forming a plurality of dimples or projections 142 (FIG. 25) in the female portion 14 which is driven into the male portion 16 of the Pittsburgh Seam during the closing process. FIG. 25 illustrates a partial side elevational view of a closed Pittsburgh Seam using the V-shaped roller member 128 illustrated in FIGS. 17-19. Since the dimples 142 are pressed into the male portion 16 of the Pittsburgh Seam, this mating and closing of the Pittsburgh Seam at each dimple 142 forms an uneven, jagged, locked connection 143 at each such dimple location thereby further preventing any shifting or slipping of the closed Pittsburgh Seam once the duct section is removed from the present apparatus.

Since the V-shaped roller member 128 includes the opening 136 positioned at the apex or joinder of the V-shaped side portions 87A and 87B, the dimples 142 formed in the female portion 14 or overlapping edge portion 22 will occur at the corner of the sealed Pittsburgh Seam as illustrated in FIG. 25. Since the V-shaped roller member 128 will traverse the entire length of the duct section and the associated Pittsburgh Seam to be closed, the dimples 142 will occur at spaced locations along the entire length of the seam to be closed. Forming of the dimples 142 during the closing process further ensures the security of the closed seam and prevents shifting and slipping of the seam which occasionally occurs during transportation and/or installation of the duct sections associated therewith.

Although FIG. 24 shows the use of two threaded set screws 138 for positioning within the bore or opening 136, it is recognized that a single set screw, or any other projection member could be utilized to achieve the extended or projected portion 140 illustrated in FIG. 24. In addition, although a threaded bore 136 is illustrated for receiving a threaded projecting member 138, it is also recognized and anticipated that any means for holding a projection member within the bore 136 during the seaming process other than the use of threads can likewise be utilized to achieve the stated objective. In addition, since the set screw or projection member 138 is threaded within the bore 136, the projection member 138 can be adjusted therewithin so as to increase or decrease the amount of extension of the projection member 138 beyond the outer surfaces 87A and 87B so as to adjust the overall depth of the dimple being formed during the seam closing process.

FIGS. 20 and 21 illustrate still another embodiment 144 of a V-shaped roller member constructed in accordance with the teachings of the present invention. The V-shaped roller member 144 is substantially similar to V-shaped roller member 128 except that the center bore 136 in roller member 128 has been eliminated and a pair of tapped bores or holes 146 and 148 are utilized, the tapped bore or opening 146 being positioned through the V-shaped side portion 87A and the tapped bore or opening 148 being positioned through the V-shaped side portion 87B. The bores or openings 146 and 148 function in the same capacity as bore 136 and are adaptable for receiving one or more set screws or other projection members such as the projections 138 illustrated in FIG. 24. Here again, at least one projection member or set screw 138 is positioned within each respective bore 146 and 148 such that one end portion thereof extends beyond the surface or perimeter of side portions 87A and 87B so as to form a pair of dimples 150 and 152 as illustrated in FIG. 26 during the seam closing process. As explained with respect to roller member 128, as roller member 144 moves along the entire length of the Pittsburgh Seam to be closed, the portion 140 of the respective projecting members 138 extending through the respective bores 146 and 148 will form the dimples or projections 150 and 152 illustrated in FIG. 26. In this embodiment, one dimple such as dimple 150 is formed on the overhanging edge portion 22 of the Pittsburgh Seam whereas the other dimple 152 is formed on the female portion 14 of the Pittsburgh Seam. In this embodiment, a dimple is formed on each side of the corner of the closed Pittsburgh Seam. Here again, the dimples 150 and 152 are pressed into and mate with the male portion 16 of the closed Pittsburgh Seam to form a secure, tight uneven or jagged locking connection 151 and 153 between the male and female portions of the Pittsburgh Seam at each dimple location to prevent shifting and slipping of the seam once it is closed as previously explained. FIG. 26 illustrates a partial side elevational view of a closed Pittsburgh Seam using V-shaped roller member 144 illustrated in FIGS. 20 and 21.

FIGS. 22 and 23 illustrate still another embodiment 154 of the V-shaped roller member constructed in accordance with the teachings of the present invention. V-shaped roller member 154 incorporates all three tapped bores or openings 136, 146 and 148. Opening 136 is positioned and located substantially perpendicular to the openings 146 and 148 although any other orientation may likewise be utilized. In this particular embodiment, the projection members 138 extending beyond the surface or perimeter of the V-shaped side portions 87A and 87B form three dimples 156, 158 and 160 at spaced locations along the entire length of the duct section during the seam closing process as illustrated in FIG. 27. Here again, dimple or projection 156 is located at the corner of the Pittsburgh Seam whereas dimples or projections 158 and 160 are located on opposite sides of the corner of the Pittsburgh Seam. As previously explained, these dimples 157, 159 and 161 are pressed into and mate with the male portion 16 of the Pittsburgh Seam to form a tight locked, uneven connection 157, 159 and 161 therebetween at each dimple location as previously explained. Depending upon the size and type of duct section being used, the particular gauge of metal being utilized, or the particular application, any one or more of the bores 136, 146 and 148 can be utilized in a particular V-shaped roller member. FIG. 27 illustrates a partial side elevational view of a closed Pittsburgh Seam utilizing the roller member 154 illustrated in FIGS. 22 and 23.

It is also recognized that one or more dimples or projections can be initially formed and/or fabricated into the Pittsburgh Seam itself prior to closing. In this regard, FIG. 28 illustrates a partial side elevational view of a Pittsburgh Seam constructed in accordance with the teachings of the present invention. Instead of utilizing any one of the V-shaped roller members 128, 144 and 154 discussed above, dimples or projections such as the projections 162 and 164 illustrated in FIG. 28 can be formed directly into the female portion 14 and the overhanging edge portion 22 associated with a typical Pittsburgh Seam. Any one or a plurality of dimples can be strategically positioned along the female portion 14 and along the overlapping edge portion 22 such that when the seam is closed, the dimples such as dimples 162 and 164 will press into and mate with the male portion 16 thereby forming an uneven, jagged and locked connection therebetween as previously explained. Fabricating a Pittsburgh Seam with one or more dimples as illustrated in FIG. 28 will achieve the same stated objective as using V-shaped roller members 128, 144 and 154 and the closing of a Pittsburgh Seam such as the seam illustrated in FIG. 28 can be accomplished using V-shaped roller member 86. Here again, the use of any plurality of dimples such as the dimples 162 and/or 164, including forming a dimple at the corner of the seam, will prevent the closed Pittsburgh Seam from shifting and/or slipping after the seam has been closed.

Still further, because an operator can position a particular duct section to be seamed on the present apparatus 24 without regard to the particular orientation of the Pittsburgh Seam positioned between the guide members 34 and 56, the present apparatus saves considerable time and is substantially more cost effective with respect to orienting a duct section on the present apparatus as compared to known prior art Pittsburgh Seam closing devices. This means that an operator can take any duct section, whether such duct section is positioned in a random pattern adjacent the seam closing apparatus or whether such duct section is coming directly off of a duct forming assembly line, and place the duct section in a vertical orientation on the support surface 28 of the present apparatus 24 such that the Pittsburgh Seam to be closed is guided by the V-shaped guide members 34 and 56 to the seam forming assembly without worrying about the specific orientation of the Pittsburgh Seam to be closed, that is, without worrying about on which side the overhanging edge portion 22 of a typical Pittsburgh Seam 10 projects relative to the positioning of the seam forming assembly. This positioning of a Pittsburgh Seam to be closed on the present apparatus regardless of the orientation of such seam saves substantial time and labor and greatly improves the efficiency of the entire process, both in forming a particular duct section and moving such formed duct section to the seam closure apparatus 24, and in efficiently closing the Pittsburgh Seam. Although the present apparatus does not completely eliminate the need for peening the opposed end portions of a particular Pittsburgh Seam to be closed, it greatly improves and speeds up the overall seam closing process. An operator simply needs to stand the duct section on end in a vertical orientation and move the duct section directly to the support surface 28 and in between the guide members 34 and 56. No specific orientation is necessary.

Other variations and modifications to the various components and assemblies comprising the present structure 24 are also contemplated and envisioned.

Thus, there has been shown and described several embodiments of a vertical Pittsburgh Seam closing apparatus which fulfills the objects and advantages sought therefor. Many changes, modifications, variations and other uses in applications of the present invention will, however, become apparent to those skilled in the art after considering this specification and the accompanying drawings. All such changes, modifications, variations and other uses in applications which do not depart from the spirit and scope of the present invention are deemed to be covered by the invention and all equivalents therefor.

The invention claimed is:

1. A substantially V-shaped roller member for use in an apparatus for closing a Pittsburgh Seam associated with a duct section, the duct section having first and second end portions, the Pittsburgh Seam to be closed having a male portion, a female portion, and an overlapping edge portion, the substantially V-shaped roller member comprising:
   first and second side portions forming the V-shaped configuration of said roller member, said first and second side portions each having a surface portion for engaging the outside portion of the Pittsburgh Seam to be closed, said first and second side portions forming an apex at their joinder;
   at least one bore extending through at least a portion of one of said first and second side portions of said V-shaped roller member; and
   at least one projection member extending through said at least one bore, said at least one projection member having a portion thereof extending beyond at least one surface portion of said first and second side portions.

2. The substantially V-shaped roller member defined in claim 1 wherein said at least one bore extending through at least a portion of one of said first and second side portions including a bore extending through the apex of said first and second side portions.

3. The substantially V-shaped roller member defined in claim 1 wherein said at least one bore extending through at least a portion of one of said first and second side portions includes a pair of bores, one of said bores extending through said first side portion and the other of said bores extending through said second side portion.

4. The substantially V-shaped roller member defined in claim 1 including a pair of shaft members for mating with a carriage assembly associated with an apparatus for closing a Pittsburgh Seam.

5. The substantially V-shaped roller member defined in claim 1 wherein said at least one bore is threaded, and wherein said at least one projection member is threadedly engageable with said at least one bore.

\* \* \* \* \*